United States Patent
Imasaka et al.

(10) Patent No.: US 12,371,799 B2
(45) Date of Patent: Jul. 29, 2025

(54) ACIDIC TREATMENT LIQUID PROCESSING APPARATUS, ACIDIC TREATMENT LIQUID PROCESSING METHOD, SURFACE TREATMENT SYSTEM, AND SURFACE TREATMENT METHOD

(71) Applicant: MITSUBISHI HEAVY INDUSTRIES, LTD., Tokyo (JP)

(72) Inventors: Koji Imasaka, Tokyo (JP); Hiroaki Mikawa, Tokyo (JP); Kohei Kawasaki, Tokyo (JP); Mitsuhiro Ishigaki, Tokyo (JP); Masahiko Nagai, Tokyo (JP); Hidehiko Tajima, Tokyo (JP); Ayako Ureshino, Tokyo (JP); Kaoru Egawa, Tokyo (JP); Akihiro Sakanishi, Tokyo (JP); Taisuke Miyazaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 992 days.

(21) Appl. No.: 17/284,522

(22) PCT Filed: Aug. 26, 2019

(86) PCT No.: PCT/JP2019/033350
§ 371 (c)(1),
(2) Date: Apr. 12, 2021

(87) PCT Pub. No.: WO2020/090204
PCT Pub. Date: May 7, 2020

(65) Prior Publication Data
US 2021/0339199 A1    Nov. 4, 2021

(30) Foreign Application Priority Data
Oct. 31, 2018    (JP) .................... 2018-205461

(51) Int. Cl.
*C23G 1/36*        (2006.01)
*B01D 61/44*       (2006.01)
(Continued)

(52) U.S. Cl.
CPC .............. *C23G 1/36* (2013.01); *B01D 61/44* (2013.01); *B01D 61/54* (2013.01); *C23C 22/24* (2013.01);
(Continued)

(58) Field of Classification Search
CPC ........ C23G 1/36; C23C 22/86; B01D 61/422; B01D 2311/25; B01D 2311/252;
(Continued)

(56) References Cited

U.S. PATENT DOCUMENTS 3,341,441 A * 9/1967 Giuffrida ............... B01D 61/52
                                                       204/525
3,481,851 A * 12/1969 Lancy .................... C25D 21/18
                                                       204/263
(Continued)

FOREIGN PATENT DOCUMENTS

CN    106830228 A  *  6/2017  ............. B01D 61/54
CN    107804901 A  *  3/2018  ............. B01D 61/48
(Continued)

OTHER PUBLICATIONS

Walsh "Electrochemical technology for environmental treatment and clean energy conversion" Pure Appl. Chem., vol. 73, No. 12, pp. 1819-1837, 2001 (Year: 2001).*
(Continued)

*Primary Examiner* — Luan V Van
*Assistant Examiner* — Alexander R. Parent
(74) *Attorney, Agent, or Firm* — HAUPTMAN HAM, LLP

(57) ABSTRACT

An acidic treatment liquid processing apparatus includes: a tank having an interior space; a diaphragm permeable to a metal cation and separating the interior space of the tank into a first chamber and a second chamber; a first electrode disposed in the first chamber; a second electrode disposed in the second chamber; a power supply configured to apply a voltage while using the first electrode as an anode and the second electrode as a cathode; a first liquid passing part configured to pass an acidic treatment liquid containing a dichromate ion and a metal cation into the first chamber; and
(Continued)

a second liquid passing part configured to pass an acid aqueous solution into the second chamber.

8 Claims, 15 Drawing Sheets

(51) Int. Cl.
- *B01D 61/54* (2006.01)
- *C02F 1/469* (2023.01)
- *C23C 22/24* (2006.01)
- *C23C 22/86* (2006.01)
- *C23G 1/12* (2006.01)

(52) U.S. Cl.
CPC .............. *C23C 22/86* (2013.01); *C23G 1/125* (2013.01); *B01D 61/445* (2013.01); *B01D 2311/24* (2013.01); *B01D 2311/252* (2022.08); *B01D 2311/2532* (2022.08); *B01D 2311/2623* (2013.01); *B01D 2311/2684* (2013.01); *B01D 2313/32* (2013.01); *B01D 2313/345* (2013.01); *B01D 2317/08* (2013.01); *C02F 1/4693* (2013.01)

(58) Field of Classification Search
CPC .... B01D 2311/2521; B01D 2311/2523; B01D 2311/2532; B01D 61/42–56; B01D 61/445; B01D 61/46; B01D 61/461–468; C02F 1/469–4698; C23F 1/46
USPC ................... 204/627–628, 630–640
See application file for complete search history.

(56) References Cited

U.S. PATENT DOCUMENTS

| | | | | |
|---|---|---|---|---|
| 3,764,503 A | * | 10/1973 | Lancy | C23G 1/36 204/522 |
| 4,115,225 A | * | 9/1978 | Parsi | B01D 61/52 204/525 |
| 4,992,380 A | * | 2/1991 | Moriarty | F28F 25/00 422/62 |
| 5,248,399 A | * | 9/1993 | Meguro | C23G 1/36 205/477 |
| 6,458,257 B1 | * | 10/2002 | Andrews | C02F 1/4672 204/266 |
| 6,821,428 B1 | * | 11/2004 | Zeiher | B01D 61/54 210/745 |
| 10,384,967 B2 | * | 8/2019 | Hancock | B01D 61/0021 |
| 2007/0215474 A1 | * | 9/2007 | Batchelder | B01D 61/44 204/524 |
| 2012/0279861 A1 | * | 11/2012 | Sparrow | B01D 61/54 204/522 |

FOREIGN PATENT DOCUMENTS

| | | | | |
|---|---|---|---|---|
| JP | S55131199 A | | 10/1980 | |
| JP | S60138079 A | | 7/1985 | |
| JP | H02247394 A | * | 10/1990 | ............ C25B 15/00 |
| JP | H0780253 A | * | 3/1995 | ............ C02F 1/4693 |
| JP | H11207347 A | | 8/1999 | |
| JP | 2015195376 A | | 11/2015 | |
| JP | 2019148005 A | | 9/2019 | |

OTHER PUBLICATIONS

Korzenowski et al. "Purification of spent chromium bath by membrane electrolysis" Journal of Hazardous Materials 152 (2008) 960-967 (Year: 2008).*

Jin et al. "Electrochemical processes for the environmental remediation of toxic Cr(VI): A review" Electrochimica Acta 191 (2016) 1044-1055 (Year: 2016).*

Astom Products Catalogue Ion Exchange Membranes/ Electrodialyzers, Diffusion Dialyzers, www.astom-corp.jp, Oct. 2017; pp. 1-17, 20pp.

International Search Report of International Application No. PCT/JP2019/033350 mailed Oct. 8, 2019; 9pp.

International Preliminary Report on Patentability for International Application No. PCT/JP2019/033350 mailed May 14, 2021; 16pp.

\* cited by examiner

ACIDIC TREATMENT LIQUID PROCESSING APPARATUS, ACIDIC TREATMENT LIQUID PROCESSING METHOD, SURFACE TREATMENT SYSTEM, AND SURFACE TREATMENT METHOD

RELATED APPLICATIONS

The present application is a National Phase of International Application Number PCT/JP2019/033350 filed Aug. 26, 2019 and claims priority to Japanese Application Number 2018-205461 filed Oct. 31, 2018.

TECHNICAL FIELD

The present invention relates to an acidic treatment liquid processing apparatus and an acidic treatment liquid processing method for use in processing of an acidic treatment liquid containing a dichromate ion and a metal cation, as well as a surface treatment system and a surface treatment method.

BACKGROUND

In aircrafts, parts made of aluminum alloy are widely used. In the manufacture of aircrafts, as a part of rust prevention treatment for these parts, surface treatment for removing stains and oxide films is performed using an acidic treatment liquid containing nitric acid or the like. In order to improve the corrosion resistance, the acidic treatment liquid may contain hexavalent chromium (dichromate ion).

When the acidic treatment liquid is repeatedly used for surface treatment, impurities such as metal components (aluminum, copper, etc.) derived from the aluminum alloy accumulate in the acidic treatment liquid. When the acidic treatment liquid contains impurities, treatment reaction is inhibited, or the impurities adhere to the parts during surface treatment, so that the quality (corrosion resistance etc.) of surface treatment is reduced. Therefore, it is necessary to periodically waste the acidic treatment liquid as industrial waste and newly prepare the acidic treatment liquid in the bath, which increases the environmental load and requires time and cost to replace the acidic treatment liquid.

On the other hand, as a method for removing copper ions from a copper etching solution containing an organic acid, a method using electrodialysis has been proposed (Patent Document 1).

CITATION LIST

Patent Literature

Patent Document 1: JP2015-195376

SUMMARY

Problems to be Solved

The present inventors have studied removing metal components from an acidic treatment liquid by an electrolytic precipitation method in order to prolong the life (reduce the frequency of replacement) of the acidic treatment liquid in which impurities are accumulated by the surface treatment. In the study, an acidic treatment liquid processing apparatus 100 as shown in FIG. 12 was used.

The acidic treatment liquid processing apparatus 100 includes a tank 101 having an interior space, a diaphragm 103 dividing the interior space of the tank 101 into a first chamber 51 and a second chamber S2, an anode 105 disposed in the first chamber 51, a cathode 107 disposed in the second chamber S2, and a liquid passing part 110 configured to pass the acidic treatment liquid. The liquid passing part 110 includes a storage tank 111 for storing the acidic treatment liquid, a first pipe 113 connecting the storage tank 111 to the second chamber S2, a pump 115 disposed on the first pipe 113, a second pipe 117 connecting the second chamber S2 to the first chamber 51, and a third pipe 119 connecting the first chamber 51 to the storage tank 111. When the pump 115 is operated, the acidic treatment liquid circulates through the storage tank 111, the second chamber S2, and the first chamber 51 in this order.

In this acidic treatment liquid processing apparatus 100, titanium or platinum-plated titanium is used as the anode 105 and the cathode 107, and an acidic treatment liquid containing copper ions is stored in the storage tank 111. Then, the pump 115 is operated to circulate the acidic treatment liquid, and voltage is applied to the anode 105 and the cathode 107. As a result, as shown in FIG. 12, cations such as copper ions move from the first chamber 51 to the second chamber S2 through the diaphragm 103. The copper ions in the second chamber S2 are reduced on the surface of the cathode 107 and precipitated on the surface of the cathode 107 to form a copper film 120. Thus, copper components are electrochemically removed from the acidic treatment liquid.

However, when the acidic treatment liquid contains hexavalent chromium (dichromate ion), in the electrolytic precipitation method, as shown in FIG. 12, while copper is reduced ($Cu^{2+}+2e^-\rightarrow Cu$), hexavalent chromium is reduced to trivalent chromium ($Cr_2O_7^{2-}+14H^++2e^-\rightarrow 2Cr^{3+}+7H_2O$). Accordingly, the hexavalent chromium concentration in the acidic treatment liquid decreases, and the quality of surface treatment deteriorates when the processed acidic treatment liquid is reused for surface treatment.

Further, some metal components contained in the acidic treatment liquid are not precipitated and thus cannot be removed by the electrolytic precipitation method. For example, aluminum cannot be removed by the electrolytic precipitation method.

Patent Document 1 has not studied removing metal components from the acidic treatment liquid as described above.

An object of the present invention is to provide an acidic treatment liquid processing apparatus and an acidic treatment liquid processing method whereby it is possible to remove metal cations from an acidic treatment liquid without reducing the concentration of hexavalent chromium, and provide a surface treatment system using the acidic treatment liquid processing apparatus, and a surface treatment method using the acidic treatment liquid processing method.

Solution to the Problems

An acidic treatment liquid processing apparatus according to an aspect of the present invention includes: a tank having an interior space; a diaphragm permeable to a metal cation and separating the interior space of the tank into a first chamber and a second chamber; a first electrode disposed in the first chamber; a second electrode disposed in the second chamber; a power supply configured to apply a voltage while using the first electrode as an anode and the second electrode as a cathode; a first liquid passing part configured to pass an acidic treatment liquid containing a dichromate ion and a metal cation into the first chamber; and a second liquid passing part configured to pass an acid aqueous solution into the second chamber.

In this aspect, when a voltage is applied to the first electrode and the second electrode, metal cations are attracted to the second electrode which is the cathode, and move to the acid aqueous solution in the second chamber through the diaphragm. On the other hand, dichromate ions, which are anions, are attracted to the first electrode which is the anode, and do not move to the acid aqueous solution in the second chamber (but remain in the acidic treatment liquid in the first chamber). At the first electrode, the reaction of reducing dichromate ions (hexavalent chromium) to trivalent chromium does not proceed. Therefore, metal cations can be removed from the acidic treatment liquid without reducing the hexavalent chromium concentration.

In the acidic treatment liquid processing apparatus according to the above aspect, the diaphragm preferably includes a cation exchange membrane.

According to this aspect, it is possible to prevent anions (nitrate ions, etc.) in the acid aqueous solution from being mixed in the acidic treatment liquid.

In the acidic treatment liquid processing apparatus according to the above aspect, the diaphragm preferably further includes a bipolar membrane in addition to the cation exchange membrane.

According to this aspect, it is possible to more effectively prevent anions (nitrate ions, etc.) in the acid aqueous solution from being mixed in the acidic treatment liquid.

Preferably, the acidic treatment liquid processing apparatus according to the above aspect further includes: a data acquisition part configured to acquire data indicating a breaking state of the diaphragm; and a control part configured to receive the data acquired by the data acquisition part, and control the power supply and the first liquid passing part. The control part is further configured to determine whether the diaphragm breaks based on the data acquired by the data acquisition part, and if it is determined that the diaphragm breaks, stop the applying of the voltage and the passing of the acidic treatment liquid.

According to this aspect, when the diaphragm breaks during the processing of acidic treatment liquid, it is possible to suppress that the acidic treatment liquid mixed with the acid aqueous solution containing metal cations increases, and that the acidic treatment liquid mixed with the acid aqueous solution containing metal cations is used for surface treatment.

In the acidic treatment liquid processing apparatus according to the above aspect, the second liquid passing part may include: a circulation passage configured to circulate a predetermined amount of the acid aqueous solution in the second chamber, an acid aqueous solution supply part configured to able to additionally supply the acid aqueous solution from outside to the circulation passage; and a supply control part configured to control the acid aqueous solution supply part.

According to this aspect, the acid aqueous solution can be additionally supplied to the acid aqueous solution circulating in the second chamber from the outside by the acid aqueous solution supply part. Accordingly, even if the acid concentration in the acid aqueous solution in the second chamber decreases with the progress of the processing reaction, and the processing performance deteriorates, by additionally supplying the acid aqueous solution from the outside, the acid concentration can be increased to recover or maintain the processing performance. As a result, it is possible to reduce the consumption of the acid aqueous solution in the circulation passage and reduce the frequency of replacement. Thus, it is possible to reduce the cost. Further, when the acid concentration in the acid aqueous solution decreases, the voltage between the electrodes increases, but the voltage between the electrodes can also be reduced by additionally supplying the acid aqueous solution to increase the acid concentration as described above. This reduces the power consumption of the power supply, thus being effective in reducing the power cost.

The acidic treatment liquid processing apparatus according to the above aspect may further include an acid concentration detection part configured to detect an acid concentration of the acid aqueous solution in the second chamber. The supply control part may be configured to control an additional supply amount of the acid aqueous solution such that the acid concentration detected by the acid concentration detection part is within a predetermined acid concentration range.

According to this aspect, the amount of the acid aqueous solution additionally supplied from the outside is controlled based on the acid concentration of the acid aqueous solution circulating in the second chamber. As a result, the acid concentration of the acid aqueous solution circulating in the second chamber is maintained in the predetermined acid concentration range, so that it is possible to maintain a suitable processing performance for a long time.

The acidic treatment liquid processing apparatus according to the above aspect may further include a voltage detection part configured to detect a voltage between the first electrode and the second electrode. The supply control part may be configured to control an additional supply amount of the acid aqueous solution such that the voltage detected by the voltage detection part is not greater than a predetermined voltage value.

According to this aspect, the amount of the acid aqueous solution additionally supplied from the outside is controlled based on the voltage between the first electrode and the second electrode. As a result, it is possible to avoid an increase in power consumption due to the voltage between the first electrode and the second electrode becoming greater than the predetermined voltage value, so that it is possible to effectively reduce the power cost required for processing.

The acidic treatment liquid processing apparatus according to the above aspect may further include an energization time counting part configured to count an energization time of the power supply. The supply control part may be configured to control the acid aqueous solution supply part such that additional supply of the acid aqueous solution starts when a cumulative energization time counted by the energization time counting part exceeds a predetermined time.

According to this aspect, the operation of supplying the acid aqueous solution from the outside by the acid aqueous solution supply part is controlled based on the energization time of the power supply. Thereby, when the acid concentration in the acid aqueous solution is expected to decrease as the energization time exceeds the predetermined time, a new acid aqueous solution is supplied from the outside to the acid aqueous solution circulating in the second chamber. As a result, the processing performance can be appropriately maintained, the increase in the voltage between the electrodes can be suppressed, and the power cost can be suitably reduced.

The acidic treatment liquid processing apparatus according to the above aspect may further include a cumulative energization amount detection part configured to detect a cumulative energization amount of the power supply. The supply control part may be configured to control the acid aqueous solution supply part such that additional supply of the acid aqueous solution starts when the cumulative energization amount exceeds a predetermined energization amount.

According to this aspect, the operation of supplying the acid aqueous solution from the outside by the acid aqueous solution supply part is controlled based on the integrated value of the energization amount (electric energy) of the power supply. Thereby, when the acid concentration in the acid aqueous solution is expected to decrease as the energization amount exceeds the predetermined energization amount, a new acid aqueous solution is supplied from the outside to the acid aqueous solution circulating in the second chamber. As a result, the processing performance can be appropriately maintained, the increase in the voltage between the electrodes can be suppressed, and the power cost can be suitably reduced.

In the acidic treatment liquid processing apparatus according to the above aspect, the second liquid passing part may include a discharge part capable of discharging the acid aqueous solution circulating in the circulation passage to outside.

According to this aspect, with the provision of the discharge part, the acid aqueous solution circulating in the circulation passage can be discharged to the outside. Accordingly, even if the volume of the acid aqueous solution circulating in the circulation passage is increased by supplying the acid aqueous solution from the outside to the circulation passage by the acid aqueous solution supply part, the volume of the acid aqueous solution circulating in the circulation passage can be appropriately adjusted by discharging at least a part of the solution to the outside.

In the acidic treatment liquid processing apparatus according to the above aspect, the acid aqueous solution may be sulfuric acid.

According to this aspect, sulfuric acid is used as the acid aqueous solution. Sulfuric acid is hardly consumed by the reduction reaction at the second electrode, which is the cathode. Therefore, it is less consumed than an acid aqueous solution such as nitric acid, which is consumed by the reduction reaction at the cathode, so that it is possible to maintain a stable processing performance for a long time.

The acidic treatment liquid processing apparatus according to the above aspect may further include a third liquid passing part configured to pass the acidic treatment liquid into the second chamber.

According to this aspect, the acidic treatment liquid can be fed into the second chamber by the third liquid passing part. In the processing reaction, precipitates are formed on the surface of the second electrode, which is the cathode, and the processing performance deteriorates as the deposition amount of the precipitates increases. However, by feeding the acidic treatment liquid into the second chamber, the precipitates can be dissolved, and the processing performance can be suitably maintained. Further, for example, by disassembling the tank and polishing the electrode surface, it is possible to eliminate the operation of removing (cleaning) the precipitates, so that the handling is easy.

In the acidic treatment liquid processing apparatus according to the above aspect, the third liquid passing part may be configured to pass the acidic treatment liquid into the second chamber when a precipitate on the second electrode exceeds a predetermined amount.

According to the above aspect, when the deposition amount of the precipitates on the second electrode exceeds the predetermined amount, the acidic treatment liquid is fed into the second chamber in which the second electrode is disposed. As a result, the precipitates can be dissolved, and the processing performance can be suitably maintained.

The acidic treatment liquid processing apparatus according to the above aspect may include: a component analysis part configured to analyze a component of the acidic treatment liquid discharged from the first chamber; and a display device capable of displaying the component detected by the component analysis part.

According to this aspect, the component analysis result of the processed acidic treatment liquid discharged from the first tank is displayed on the display device. Accordingly, the operator who monitors the display device can take immediate action (e.g., apparatus shutdown) when an anomaly occurs (e.g., sudden increase in concentration of particular component).

An acidic treatment liquid processing method according to an aspect of the present invention includes: passing an acidic treatment liquid containing a dichromate ion and a metal cation into a first chamber separated from a second chamber by a diaphragm permeable to a metal cation, and passing an acid aqueous solution into the second chamber; and applying a voltage while using a first electrode disposed in the first chamber as an anode and a second electrode disposed in the second chamber as a cathode to move a metal cation in the acidic treatment liquid to the acid aqueous solution through the diaphragm.

In this aspect, when a voltage is applied to the first electrode and the second electrode, metal cations in the acidic treatment liquid in the first chamber are attracted to the second electrode which is the cathode, and move to the acid aqueous solution in the second chamber through the diaphragm. On the other hand, dichromate ions, which are anions, are attracted to the first electrode which is the anode, and do not move to the acid aqueous solution in the second chamber (but remain in the acidic treatment liquid in the first chamber). At the first electrode, the reaction of reducing dichromate ions (hexavalent chromium) to trivalent chromium does not proceed. Therefore, metal cations can be removed from the acidic treatment liquid without reducing the hexavalent chromium concentration.

In the acidic treatment liquid processing method according to the above aspect, the diaphragm preferably includes a cation exchange membrane.

According to this aspect, it is possible to prevent anions (nitrate ions, etc.) in the acid aqueous solution from being mixed in the acidic treatment liquid.

In the acidic treatment liquid processing method according to the above aspect, the diaphragm preferably further includes a bipolar membrane in addition to the cation exchange membrane.

According to this aspect, it is possible to more effectively prevent anions (nitrate ions, etc.) in the acid aqueous solution from being mixed in the acidic treatment liquid.

Preferably, the acidic treatment liquid processing method according to the above aspect includes, during applying a voltage to the first electrode and the second electrode, acquiring data indicating a breaking state of the diaphragm, determining whether the diaphragm breaks based on the acquired data, and if it is determined that the diaphragm breaks, stopping the applying of the voltage and the passing of the acidic treatment liquid.

According to this aspect, when the diaphragm breaks during the processing of acidic treatment liquid, it is possible to suppress that the acidic treatment liquid mixed with the acid aqueous solution containing metal cations increases, and that the acidic treatment liquid mixed with the acid aqueous solution containing metal cations is used for surface treatment.

The acidic treatment liquid processing method according to the above aspect may include additionally supplying the acid aqueous solution from outside to a circulation passage configured to circulate a predetermined amount of the acid aqueous solution in the second chamber.

According to this aspect, the acid aqueous solution can be additionally supplied to the acid aqueous solution circulating in the second chamber from the outside. Accordingly, even if the acid concentration in the acid aqueous solution in the second chamber decreases with the progress of the processing reaction, and the processing performance deteriorates, by additionally supplying the acid aqueous solution from the outside, the acid concentration can be increased to recover or maintain the processing performance. As a result, it is possible to reduce the consumption of the acid aqueous solution in the circulation passage and reduce the frequency of replacement. Thus, it is possible to reduce the cost. Further, when the acid concentration in the acid aqueous solution decreases, the voltage between the electrodes increases, but the voltage between the electrodes can also be reduced by additionally supplying the acid aqueous solution to increase the acid concentration as described above. This reduces the power consumption of the power supply, thus being effective in reducing the power cost.

In the acidic treatment liquid processing method according to the above aspect, an additional supply amount of the acid aqueous solution may be controlled such that an acid concentration of the acid aqueous solution in the second chamber is within a predetermined acid concentration range.

According to this aspect, the amount of the acid aqueous solution additionally supplied from the outside is controlled based on the acid concentration of the acid aqueous solution circulating in the second chamber. As a result, the acid concentration of the acid aqueous solution circulating in the second chamber is maintained in the predetermined acid concentration range, so that it is possible to maintain a suitable processing performance for a long time.

In the acidic treatment liquid processing method according to the above aspect, an additional supply amount of the acid aqueous solution may be controlled such that a voltage between the first electrode and the second electrode is not greater than a predetermined voltage value.

According to this aspect, the amount of the acid aqueous solution additionally supplied from the outside is controlled based on the voltage between the first electrode and the second electrode. As a result, it is possible to avoid an increase in power consumption due to the voltage between the first electrode and the second electrode becoming greater than the predetermined voltage value, so that it is possible to effectively reduce the power cost required for processing.

In the acidic treatment liquid processing method according to the above aspect, additional supply of the acid aqueous solution may start when a cumulative energization time of the power supply exceeds a predetermined time.

According to this aspect, the operation of supplying the acid aqueous solution from the outside is controlled based on the energization time of the power supply. Thereby, when the acid concentration in the acid aqueous solution is expected to decrease as the energization time exceeds the predetermined time, a new acid aqueous solution is supplied from the outside to the acid aqueous solution circulating in the second chamber. As a result, the processing performance can be appropriately maintained, the increase in the voltage between the electrodes can be suppressed, and the power cost can be suitably reduced.

In the acidic treatment liquid processing method according to the above aspect, additional supply of the acid aqueous solution may start when a cumulative energization amount of the power supply exceeds a predetermined energization amount.

According to this aspect, the operation of supplying the acid aqueous solution from the outside is controlled based on the integrated value of the energization amount (electric energy) of the power supply. Thereby, when the acid concentration in the acid aqueous solution is expected to decrease as the energization amount exceeds the predetermined energization amount, a new acid aqueous solution is supplied from the outside to the acid aqueous solution circulating in the second chamber. As a result, the processing performance can be appropriately maintained, the increase in the voltage between the electrodes can be suppressed, and the power cost can be suitably reduced.

The acidic treatment liquid processing method according to the above aspect may include discharging the acid aqueous solution circulating in the circulation passage to outside.

According to this aspect, the acid aqueous solution circulating in the circulation passage can be discharged to the outside. Accordingly, even if the volume of the acid aqueous solution circulating in the circulation passage is increased by supplying the acid aqueous solution from the outside to the circulation passage, the volume of the acid aqueous solution circulating in the circulation passage can be appropriately adjusted by discharging at least a part of the solution to the outside.

In the acidic treatment liquid processing method according to the above aspect, the acid aqueous solution may be sulfuric acid.

According to this aspect, sulfuric acid is used as the acid aqueous solution. Sulfuric acid is hardly consumed by the reduction reaction at the second electrode, which is the cathode. Therefore, it is less consumed than an acid aqueous solution such as nitric acid, which is consumed by the reduction reaction at the cathode, so that it is possible to maintain a stable processing performance for a long time.

The acidic treatment liquid processing method according to the above aspect may further include passing the acidic treatment liquid into the second chamber.

According to this aspect, the acidic treatment liquid can be fed into the second chamber. In the processing reaction, precipitates are formed on the surface of the second electrode, which is the cathode, and the processing performance deteriorates as the deposition amount of the precipitates increases. However, by feeding the acidic treatment liquid into the second chamber, the precipitates can be dissolved, and the processing performance can be suitably maintained. Further, for example, by disassembling the tank and polishing the electrode surface, it is possible to eliminate the operation of removing (cleaning) the precipitates, so that the handling is easy.

In the acidic treatment liquid processing method according to the above aspect, the acidic treatment liquid may be passed into the second chamber when a precipitate on the second electrode exceeds a predetermined amount.

According to the above aspect, when the deposition amount of the precipitates on the second electrode exceeds the predetermined amount, the acidic treatment liquid is fed into the second chamber in which the second electrode is disposed. As a result, the precipitates can be dissolved, and the processing performance can be suitably maintained.

The acidic treatment liquid processing method according to the above aspect may further include displaying a component of the acidic treatment liquid discharged from the first chamber.

According to this aspect, the component analysis result of the processed acidic treatment liquid discharged from the first tank is displayed on a display device such as a display. Accordingly, the operator who monitors the display content can take immediate action (e.g., apparatus shutdown) when an anomaly occurs (e.g., sudden increase in concentration of particular component).

A surface treatment system according to an aspect of the present invention includes; the acidic treatment liquid processing apparatus according to the above aspect; a surface treatment tank storing an acidic treatment liquid containing a dichromate ion for performing surface treatment of a metallic material using the acidic treatment liquid; and an acidic treatment liquid transfer part configured to supply the acidic treatment liquid which has been used for the surface treatment and contains a dichromate ion and a metal cation from the surface treatment tank to the first liquid passing part, and to return the acidic treatment liquid processed by the acidic treatment liquid processing apparatus from the first liquid passing part to the surface treatment tank.

In the surface treatment system according to this aspect, when a voltage is applied to the first electrode and the second electrode of the acidic treatment liquid processing apparatus, metal cations in the acidic treatment liquid in the first chamber are attracted to the second electrode which is the cathode, and move to the acid aqueous solution in the second chamber through the diaphragm. On the other hand, dichromate ions, which are anions, are attracted to the first electrode which is the anode, and do not move to the acid aqueous solution in the second chamber (but remain in the acidic treatment liquid in the first chamber). At the first electrode, the reaction of reducing dichromate ions (hexavalent chromium) to trivalent chromium does not proceed. Therefore, metal cations can be removed from the acidic treatment liquid without reducing the hexavalent chromium concentration.

Thus, when the acidic treatment liquid from which metal cations are removed without reducing the hexavalent chromium concentration is returned to the surface treatment tank and reused for surface treatment of the metallic material, it is possible to prolong the life of the acidic treatment liquid. That is, it is possible to reduce the frequency (replacement frequency) of wasting and preparing the acidic treatment liquid in the surface treatment tank, and reduce the amount of industrial waste.

A surface treatment method according to an aspect of the present invention includes; performing surface treatment of a metallic material using an acidic treatment liquid containing a dichromate ion; processing the acidic treatment liquid which has been used for the surface treatment and contains a dichromate ion and a metal cation by the acidic treatment liquid processing method according to the above aspect; and reusing the acidic treatment liquid processed by the acidic treatment liquid processing method for the surface treatment.

In the surface treatment method according to this aspect, when a voltage is applied to the first electrode and the second electrode in the acidic treatment liquid processing step, metal cations in the acidic treatment liquid in the first chamber are attracted to the second electrode which is the cathode, and move to the acid aqueous solution in the second chamber through the diaphragm. On the other hand, dichromate ions, which are anions, are attracted to the first electrode which is the anode, and do not move to the acid aqueous solution in the second chamber (but remain in the acidic treatment liquid in the first chamber). At the first electrode, the reaction of reducing dichromate ions (hexavalent chromium) to trivalent chromium does not proceed. Therefore, metal cations can be removed from the acidic treatment liquid without reducing the hexavalent chromium concentration.

Thus, when the acidic treatment liquid from which metal cations are removed without reducing the hexavalent chromium concentration is reused for surface treatment of the metallic material, it is possible to prolong the life of the acidic treatment liquid. That is, it is possible to reduce the frequency (replacement frequency) of wasting and preparing the acidic treatment liquid.

Advantageous Effects

According to the present invention, there is provided an acidic treatment liquid processing apparatus and an acidic treatment liquid processing method whereby it is possible to remove metal cations from an acidic treatment liquid without reducing the concentration of hexavalent chromium, and provide a surface treatment system using the acidic treatment liquid processing apparatus, and a surface treatment method using the acidic treatment liquid processing method.

DETAILED DESCRIPTION

First Embodiment

The first embodiment of the present invention will now be described with reference to the drawings.

Figure 1:
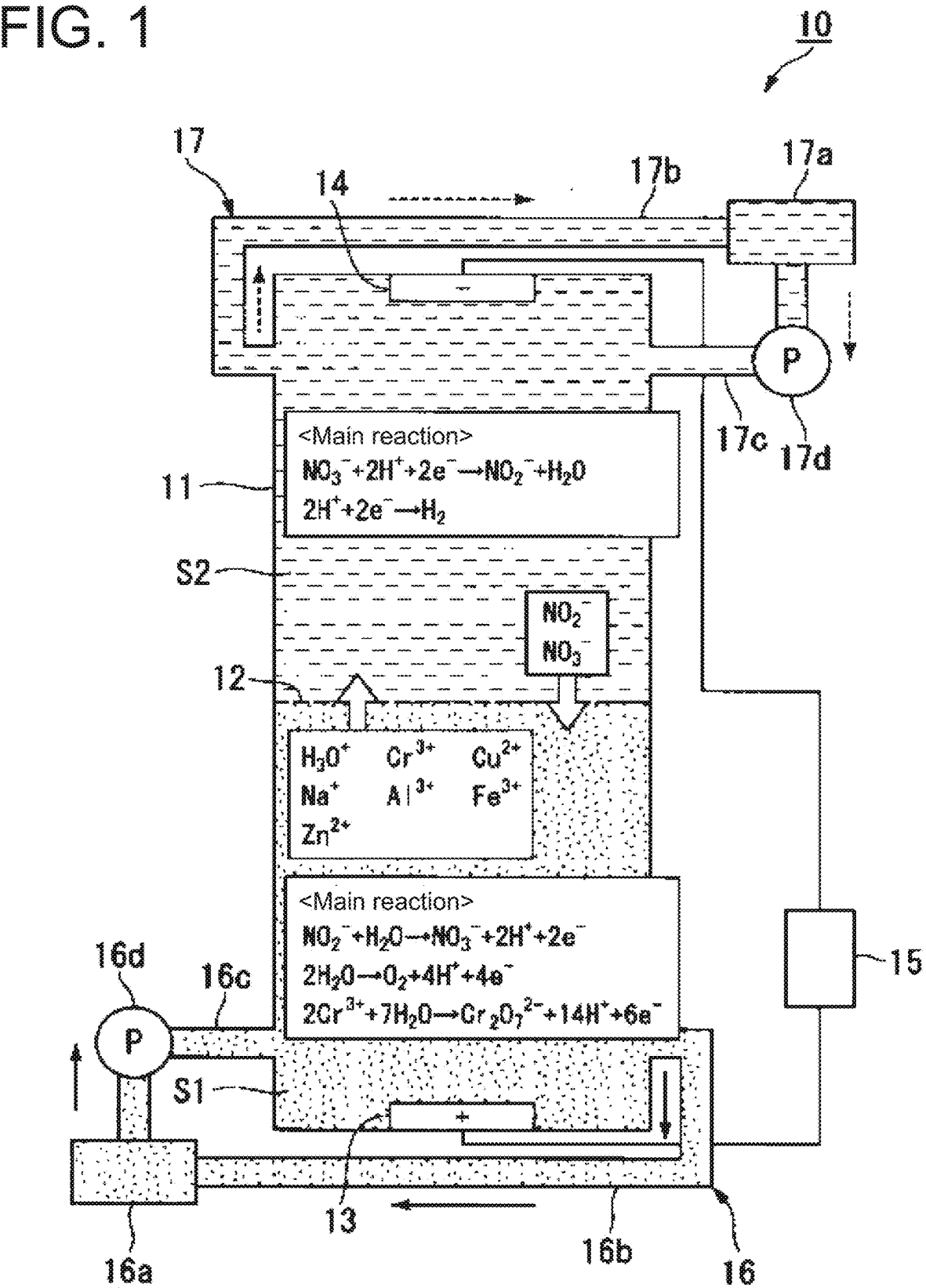
FIG. 1 is a schematic configuration diagram of an acidic treatment liquid processing apparatus according to a first embodiment.

FIG. 1 is a schematic configuration diagram of an acidic treatment liquid processing apparatus 10 according to the first embodiment. The dimensional ratio in FIG. 1 is different from the actual one for convenience of explanation. The same applies to embodiments described later.

The acidic treatment liquid processing apparatus 10 includes a tank 11, a diaphragm 12, a first electrode 13, a second electrode 14, a power supply 15, a first liquid passing part 16, and a second liquid passing part 17.

The tank 11 has an interior space. The diaphragm 12 separates the interior space of the tank 11 into a first chamber S1 and the second chamber S2. The first electrode 13 is disposed in the first chamber S1. The second electrode 14 is disposed in the second chamber S2. The power supply 15 is configured to apply a voltage using the first electrode 13 as an anode and the second electrode 14 as a cathode.

The first liquid passing part 16 includes an acidic treatment liquid storage tank 16a for storing the acidic treatment liquid, a first pipe 16b connected at one end to a lower portion of the tank 11 (position corresponding to first chamber S1) and connected at the other end to the acidic treatment liquid storage tank 16a, a second pipe 16c connected at one end to the acidic treatment liquid storage tank 16a and connected at the other end to a lower portion of the tank 11 different from the position to which the first pipe 16b is connected, and a pump 16d disposed on the second pipe 16c. When the pump 16d is operated, the acidic treatment liquid is fed into the first chamber S1.

During operation of the pump 16d, the acidic treatment liquid circulates in the direction of arrow in FIG. 1, i.e., through the acidic treatment liquid storage tank 16a, the second pipe 16c, the first chamber S1, and the first pipe 16b in this order.

The acidic treatment liquid contains dichromate ions and metal cations.

The acidic treatment liquid is typically an acidic treatment liquid after being used for surface treatment of a metallic material.

The metallic material indicates metal or alloy. Examples of the metallic material include aluminum, aluminum alloy, titanium, titanium alloy, stainless steel, and copper alloy. Examples of the aluminum alloy include alloys containing one or more of Cu, Fe, Zn, Mn, Mg, Cr, Ti, and S1 as a component.

The metallic material is preferably aluminum or aluminum alloy, particularly preferably aluminum alloy.

The acidic treatment liquid before being used for surface treatment of a metallic material contains dichromate ions. It also typically contains nitric acid in addition to dichromate ions. When the dichromate ions are derived from a metal salt of dichromic acid, metal cations corresponding to this metal salt are contained. $Cr'$ produced by the reduction of dichromate ions may also be contained. In addition, if necessary, hydrofluoric acid, hydrofluoric acid salt, surfactant, chelating agent may be further contained.

When surface treatment of a metallic material is performed using such an acidic treatment liquid, metal components in the metallic material are eluted into the acidic treatment liquid. As the surface treatment using the acidic treatment liquid is repeated, metal cations accumulate in the acidic treatment liquid.

Accordingly, the acidic treatment liquid after being used for surface treatment of a metallic material contains metal cations derived from the metallic material in addition to components (dichromate ions, etc.) contained in the acidic treatment liquid before being used for surface treatment.

Illustrative examples of the metal cation in the acidic treatment liquid include $Na^+$, $K^+$, $Cu^{2+}$, $Zn^{2+}$, $Mg^{2+}$, $Ca^{2+}$, $Mn^{2+}$, $Co^{2+}$, $Ni^{2+}$, $Al^{3+}$, $Fe^{3+}$, $Pb^{3+}$, and $Ti^{3+}$.

The nitric acid concentration of the acidic treatment liquid may be, for example, 1 to 50% by mass.

The dichromate ion concentration of the acidic treatment liquid may be, for example, 0.01 to 10% by mass.

The metal cation concentration of the acidic treatment liquid may be, for example, more than 0% by mass and 10% by mass or less.

The pH of the acidic treatment liquid may be, for example, 6 or less at 25° C.

The second liquid passing part 17 includes an acid aqueous solution storage tank 17a for storing the acid aqueous solution, a third pipe 17b connected at one end to an upper portion of the tank 11 (position corresponding to second chamber S2) and connected at the other end to the acid aqueous solution storage tank 17a, a fourth pipe 17c connected at one end to the acid aqueous solution storage tank 17a and connected at the other end to an upper portion of the tank 11 different from the position to which the third pipe 17b is connected, and a pump 17d disposed on the fourth pipe 17c. When the pump 17d is operated, the acid aqueous solution is fed into the second chamber S2.

During operation of the pump 17d, the acid aqueous solution circulates in the direction of dotted arrow in FIG. 1, i.e., through the acid aqueous solution storage tank 17a, the fourth pipe 17c, the second chamber S2, and the third pipe 17b in this order.

The acid in the acid aqueous solution functions as supply source of hydrogen ions which exchange electrons at the second electrode 14. Examples of the acid include nitric acid, sulfuric acid, and hydrochloric acid.

During processing of the acidic treatment liquid, the diaphragm 12 may break. At this time, if acid not contained in the acidic treatment liquid is mixed from the acid aqueous solution, the acidic treatment liquid reused for surface treatment of a metallic material may adversely affect the surface treatment quality. Therefore, the acid in the acid aqueous solution is preferably the same acid as that contained in the acidic treatment liquid. When the acidic treatment liquid contains nitric acid, the acid in the acid aqueous solution is preferably nitric acid.

The acid concentration of the acid aqueous solution may be, for example, 1 to 50% by mass.

The pH of the acid aqueous solution may be, for example, 6 or less at 25° C.

In the case where sulfuric acid is used as acid in the acid aqueous solution, the sulfuric acid is hardly consumed by the reduction reaction at the second electrode 14, which is the cathode. Therefore, it is less consumed than an acid aqueous solution such as nitric acid, which is consumed by the reduction reaction at the second electrode 14, so that it is possible to maintain a stable processing performance for a long time.

The diaphragm 12 is a membrane permeable to metal cations. When a voltage is applied to the first electrode 13 which is the anode and the second electrode 14 which is the cathode, metal cations in the acidic treatment liquid in the first chamber S1 move to the acid aqueous solution in the second chamber S2 through the diaphragm 12.

Examples of the diaphragm 12 include porous membranes such as an electrolytic membrane, an unglazed plate, a cation exchange membrane, and a bipolar membrane. The electrolytic membrane desirably includes fluororesin. Examples of the fluororesin include polytetrafluoroethylene (tetrafluoroethylene; PTFE), a partially fluorinated olefin resin, and a fluorinated olefin copolymer. Examples of the partially fluorinated olefin resin include polychlorotrifluoroethylene (trifluorinated resin; PCTFE or CTFE), polyvinylidene fluoride (PVDF), and polyvinyl fluoride (PVF). Examples of the fluorinated olefin copolymer include perfluoroalkoxy alkane (PFA), ethylene tetrafluoride-propylene hexafluoride copolymer (FEP), ethylene-ethylene tetrafluoride copolymer (ETFE), and ethylene-chlorotrifluoroethylene copolymer (ECTFE). The bipolar membrane is an ion exchange membrane having a structure in which an anion exchange layer and a cation exchange layer are laminated. Examples of the cation exchange resin constituting the cation exchange membrane or the cation exchange layer include resins having a functional group such as a sulfo group and a carboxyl group. Examples of the anion exchange resin constituting the anion exchange layer include resins having a quaternary ammonium group or a primary to tertiary amino group.

The electrolytic membrane and the unglazed plate are permeable to both cations and anions. Therefore, in the case where the electrolytic membrane or the unglazed plate is used as the diaphragm 12, when a voltage is applied to the first electrode 13 which is the anode and the second electrode 14 which is the cathode, cations in the acidic treatment liquid in the first chamber S1 move to the acid aqueous solution in the second chamber S2 through the diaphragm 12, and anions in the acid aqueous solution in the second chamber S2 move to the acidic treatment liquid in the first chamber S1 through the diaphragm 12.

The cation exchange membrane is permeable to cations but impermeable to anions. Therefore, when a voltage is applied to the first electrode 13 which is the anode and the second electrode 14 which is the cathode, cations in the acidic treatment liquid in the first chamber S1 move to the acid aqueous solution in the second chamber S2 through the diaphragm 12. However, anions in the acid aqueous solution in the second chamber S2 do not permeate the diaphragm 12 but remain in the acid aqueous solution.

The diaphragm 12 is preferably a cation exchange membrane. When the diaphragm 12 is a cation exchange membrane, it is possible to suppress the movement of anions from the second electrode 14 side (acid aqueous solution) to the first electrode 13 side (acidic treatment liquid) of the diaphragm 12.

When anions ($NO_2^-$, $NO_3^-$, etc.) in the acid aqueous solution move to the acidic treatment liquid, the concentration and composition of acid in the acidic treatment liquid change. When this acidic treatment liquid is reused for surface treatment of a metallic material, the surface treatment quality may fluctuate. Further, the acidic treatment liquid may contain anions such as $F^-$ as a component for surface treatment, and when the anion concentration in the acidic treatment liquid decreases, and this acidic treatment liquid is reused for surface treatment of a metallic material, the surface treatment quality may fluctuate.

When the diaphragm 12 is the cation exchange membrane, it is possible to suppress such movement of anions, and suppress the fluctuation of the surface treatment quality.

The electrical resistance of the diaphragm 12 may be, for example, 100 $\Omega \cdot dm^2$ or less.

The thickness of the diaphragm 12 may be, for example, 1 to 10000 μm.

Examples of the material of the first electrode 13 include Pt, Pt-plated Ti, $PbO_2$-coated Ti, and Ti.

Examples of the material of the second electrode 14 include Pt, Pt-plated Ti, and Ti.

The distance between the first electrode 13 and the second electrode 14 may be, for example, 100 cm or less.

The acidic treatment liquid processing apparatus 10 is used for processing the acidic treatment liquid containing dichromate ions and metal cations. Specifically, the apparatus is used for removing metal cations from the acidic treatment liquid.

An example of the acidic treatment liquid processing method using the acidic treatment liquid processing apparatus 10 will now be described with reference to FIG. 1. In this example, the acidic treatment liquid containing nitric acid, dichromate ions, and metal cations $Cr^{3+}$, $Cu^{2+}$, $Na^+$, $Al^{3+}$, $Fe^{3+}$, $Zn^{2+}$ is processed using nitric acid aqueous solution as the acid aqueous solution.

In the acidic treatment liquid processing apparatus 10, the pump 16d is operated to feed the acidic treatment liquid into the first chamber 51, and the pump 17d is operated to feed the acid aqueous solution into the second chamber S2. While the first chamber 51 is filled with the acidic treatment liquid, and the second chamber S2 is filled with the acid aqueous solution, a voltage is applied by the power supply 15 using the first electrode 13 as the anode and the second electrode 14 as the cathode.

At this time, as shown in FIG. 1, the following reactions 1-1 to 1-3 mainly proceed at the first electrode 13, and the following reactions 2-1 to 2-2 mainly proceed at the second electrode 14. Further, cations ($H_3O^+$, $Cr^{3+}$, $Cu^{2+}$, $Na^+$, $Al^{3+}$, $Fe^{3+}$, $Zn^{2+}$) in the acidic treatment liquid are attracted to the second electrode 14, permeate the diaphragm 12, and move to the acid aqueous solution. In the case where the diaphragm 12 is also permeable to anions, anions ($NO_2^-$, $NO_3^-$) in the acid aqueous solution are attracted to the first electrode 13, permeate the diaphragm 12, and move to the acidic treatment liquid.

$$NO_2^- + H_2O \rightarrow NO_3^- + 2H^+ + 2e^- \quad \text{Reaction 1-1:}$$

$$2H_2O \rightarrow O_2 + 4H^+ + 4e^- \quad \text{Reaction 1-2:}$$

$$2Cr^{3+} + 7H_2O \rightarrow Cr_2O_7^{2-} + 14H^+ + 6e^- \quad \text{Reaction 1-3:}$$

$$NO_3^- + 2H^+ + 2e^- \rightarrow NO_2^- + H_2O \quad \text{Reaction 2-1:}$$

$$2H^+ + 2e^- \rightarrow H_2 \quad \text{Reaction 2-2:}$$

In the processing, the amount of the acidic treatment liquid fed into the first chamber S1 may be, for example, 100 t/hr or less. The temperature of the acidic treatment liquid may be, for example, 1 to 80° C.

The amount of the acid aqueous solution fed into the second chamber S2 may be, for example, 100 t/hr or less. The temperature of the acid aqueous solution may be, for example, 1 to 80° C.

The applied voltage may be, for example, more than 0 V and 1000 V or less.

The current density may be, for example, more than 0 $A/dm^2$ and 100 $A/dm^2$ or less.

With the acidic treatment liquid processing method according to the present embodiment, as metal cations in the acidic treatment liquid move to the acid aqueous solution, the metal cations are removed from the acidic treatment liquid. On the other hand, since dichromate ions in the acidic treatment liquid are anions and thus are attracted to the first electrode 13, even if the diaphragm 12 is permeable to anions, the dichromate ions do not permeate or hardly permeate the diaphragm 12. Further, the acidic treatment liquid does not come into contact with the second electrode 14 which is the cathode. Thus, it is possible to suppress a side reaction in which dichromate ions (hexavalent chromium) in the acidic treatment liquid are reduced. Similarly, it is possible to suppress a side reaction in which nitric acid ($NO_3^-$) in the acidic treatment liquid is reduced. As a result, it is possible to remove metal cations in the acidic treatment liquid without reducing hexavalent chromium and nitric acid. In addition, it is possible to further remove metal cations, such as aluminum ions, which cannot be removed by the electrolytic precipitation method.

The acidic treatment liquid from which metal cations are removed as described above can be reused for surface treatment without wasting the liquid. Further, in the reuse, since the metal cation concentration can be maintained low, the risk of mixing metal cations due to surface treatment can be reduced, and metal can be recovered at high purity.

In particular, when nitric acid which is the same as acid contained in the acidic treatment liquid is selected as acid of the acid aqueous solution, while supplying hydrogen ions which exchange electrons, it is possible to prevent the acidic treatment liquid from being mixed with foreign acids and affecting the surface treatment quality even if the diaphragm 12 breaks.

When the cation exchange membrane is selected as the diaphragm 12, it is possible to prevent nitric acid in the acid aqueous solution from being mixed into the acidic treatment liquid and fluctuating the nitric acid concentration in the acidic treatment liquid.

During the processing of the acidic treatment liquid, water ($H_3O^+$) moves from the acidic treatment liquid to the acid aqueous solution on the cathode side. Therefore, the increased water may be removed from the acid aqueous solution during or after the processing of the acidic treatment liquid. This makes it possible to suppress an increase in the amount of liquid and continue using the acid aqueous solution. The water may be removed by a general heat concentration method, or by heating evaporation with sunlight or air drying.

In the acidic treatment liquid processing apparatus 10 according to the first embodiment, a plurality of tanks 11, diaphragms 12, first electrodes 13, and second electrodes 14 may be arranged in series or parallel with the surface treatment tank 16a.

Figure 2:
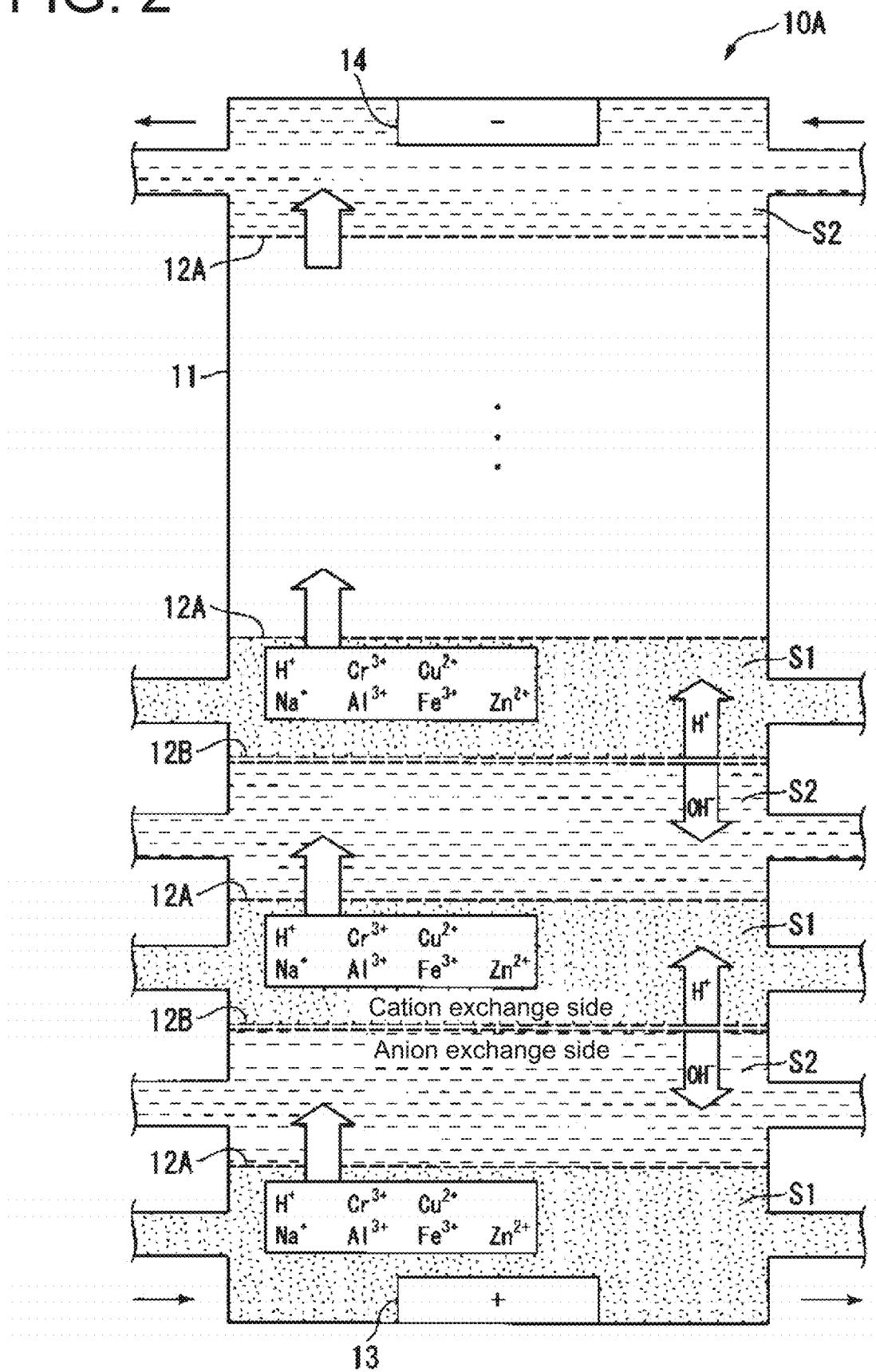
FIG. 2 is a schematic configuration diagram of a modified example of the acidic treatment liquid processing apparatus according to the first embodiment.

FIG. 2 shows a modified example of the acidic treatment liquid processing apparatus 10. The acidic treatment liquid processing apparatus 10A in this example includes a plurality of diaphragms 12 for the surface treatment tank 16a, and the diaphragm 12 includes both cation exchange membranes 12A and bipolar membranes 12B. In the tank 11, the cation exchange membranes 12A and the bipolar membranes 12B are alternately arranged from the first electrode 13 to the second electrode 14. Each bipolar membrane 12B is arranged such that the anion exchange layer faces toward the first electrode 13 (the cation exchange layer faces toward the second electrode 14).

As with the first chamber S1 of the first embodiment, the acidic treatment liquid is fed to a space on the first electrode 13 side of the cation exchange membrane 12A (on the second electrode 14 side of the bipolar membrane 12B). Further, as with the second chamber S2 of the first embodiment, the acid aqueous solution is fed to a space on the second electrode 14 side of the cation exchange membrane 12A (on the first electrode 13 side of the bipolar membrane 12B).

A space between the first electrode 13 and the cation exchange membrane 12A closest to the first electrode 13 and a space between the other cation exchange membrane 12A and the bipolar membrane 12B on the first electrode 13 side thereof correspond to the first chamber S1. A space between the second electrode 14 and the cation exchange membrane 12A closest to the second electrode 14 and a space between the other cation exchange membrane 12A and the bipolar membrane 12B on the second electrode 14 side thereof correspond to the second chamber S2.

When both the cation exchange membrane 12A and the bipolar membrane 12B are used as the diaphragm 12, it is possible to more effectively suppress the movement of anions from the second electrode 14 side to the first electrode 13 side than when only the cation exchange membrane 12A is used. Accordingly, only by providing a single pair of the first electrode 13 and the second electrode 14 (without providing a plurality of tanks 11, first electrodes 13, and second electrodes 14 for the surface treatment tank 16a), cations contained in the acidic treatment liquid on the first electrode 13 side of the cation exchange membrane 12A can be effectively moved to the acid aqueous solution on the second electrode 14 side of the cation exchange membrane 12A.

A relatively durable electrolytic membrane may be used in combination with the cation exchange membrane 12A and the bipolar membrane 12B to prevent the removed metal cations from returning to the acidic treatment liquid even when the cation exchange membrane 12A and the bipolar membrane 12B are damaged.

Second Embodiment

Next, the second embodiment of the present invention will be described with reference to the drawings. In the following embodiment, the same constituent elements as those in the preceding embodiment are associated with the same reference numerals and not described again.

Figure 3:
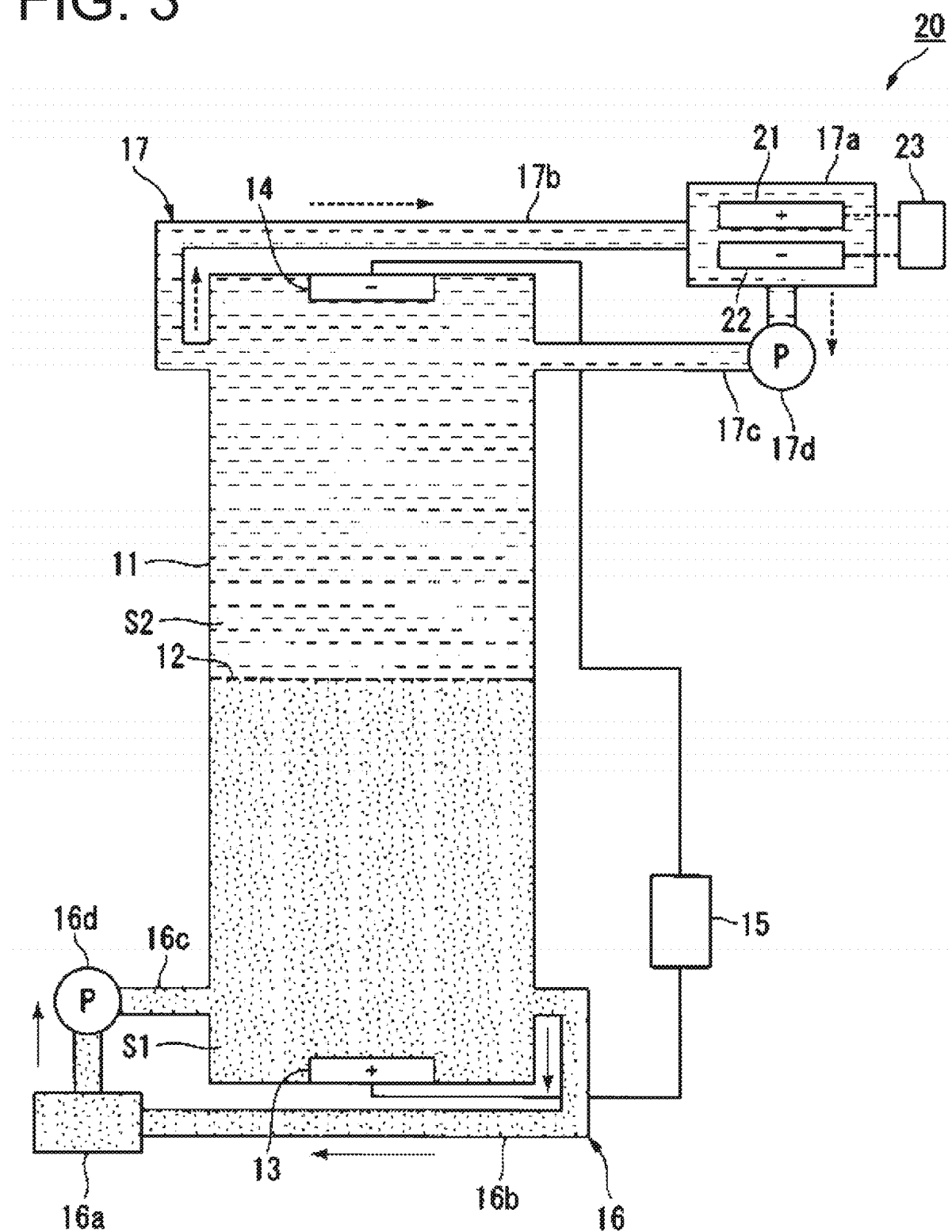
FIG. 3 is a schematic configuration diagram of an acidic treatment liquid processing apparatus according to a second embodiment.

FIG. 3 is a schematic configuration diagram of an acidic treatment liquid processing apparatus 20 according to the second embodiment.

The acidic treatment liquid processing apparatus 20 includes a tank 11, a diaphragm 12, a first electrode 13, a second electrode 14, a power supply 15, a first liquid passing part 16, a second liquid passing part 17, a third electrode 21, a fourth electrode 22, and a second power supply 23.

The acidic treatment liquid processing apparatus 20 is the same as the acidic treatment liquid processing apparatus 10 of the first embodiment except that the third electrode 21, the fourth electrode 22, and the second power supply 23 are further included.

The third electrode 21 and the fourth electrode 22 are disposed in the acid aqueous solution storage tank 17a.

The second power supply 23 is configured to apply a voltage using the third electrode 21 as an anode and the fourth electrode 22 as a cathode.

Examples of the material of the third electrode 21 include Ti and Pt-plated Ti.

Examples of the material of the fourth electrode 22 include Ti and Pt-plated Ti.

The distance between the third electrode 21 and the fourth electrode 22 may be, for example, 100 cm or less.

The distance between the third electrode 21 and the second electrode 14 may be, for example, 100 cm or less.

The acidic treatment liquid processing apparatus 20 is used for processing the acidic treatment liquid containing dichromate ions and metal cations, as with the acidic treatment liquid processing apparatus 10.

The processing of the acidic treatment liquid using the acidic treatment liquid processing apparatus 20 can be performed in the same way as the processing of the acidic treatment liquid using the acidic treatment liquid processing apparatus 10 except that a voltage is further applied by the second power supply 23 using the third electrode 21 as the anode and the fourth electrode 22 as the cathode.

When a voltage is applied by the second power supply 23, metal cations are reduced on the surface of the fourth electrode 22 and precipitated on the surface of the fourth electrode 22. As a result, metal cations are removed from the acid aqueous solution. Examples of metal cations that may be precipitated on the surface of the fourth electrode 22 include copper ions.

The voltage applied by the second power supply 23 may be, for example, more than 0 V and 1000 V or less.

The current density may be, for example, more than 0 $A/dm^2$ and 100 $A/dm^2$ or less.

With the acidic treatment liquid processing method according to this embodiment, as with the first embodiment, it is possible to remove metal cations in the acidic treatment liquid without reducing hexavalent chromium and nitric acid. Further, in the acid aqueous solution storage tank 17a, it is possible to remove metal cations moved to the acid aqueous solution by the electrolytic precipitation method.

Third Embodiment

Next, the third embodiment of the present invention will be described with reference to the drawings.

Figure 4:
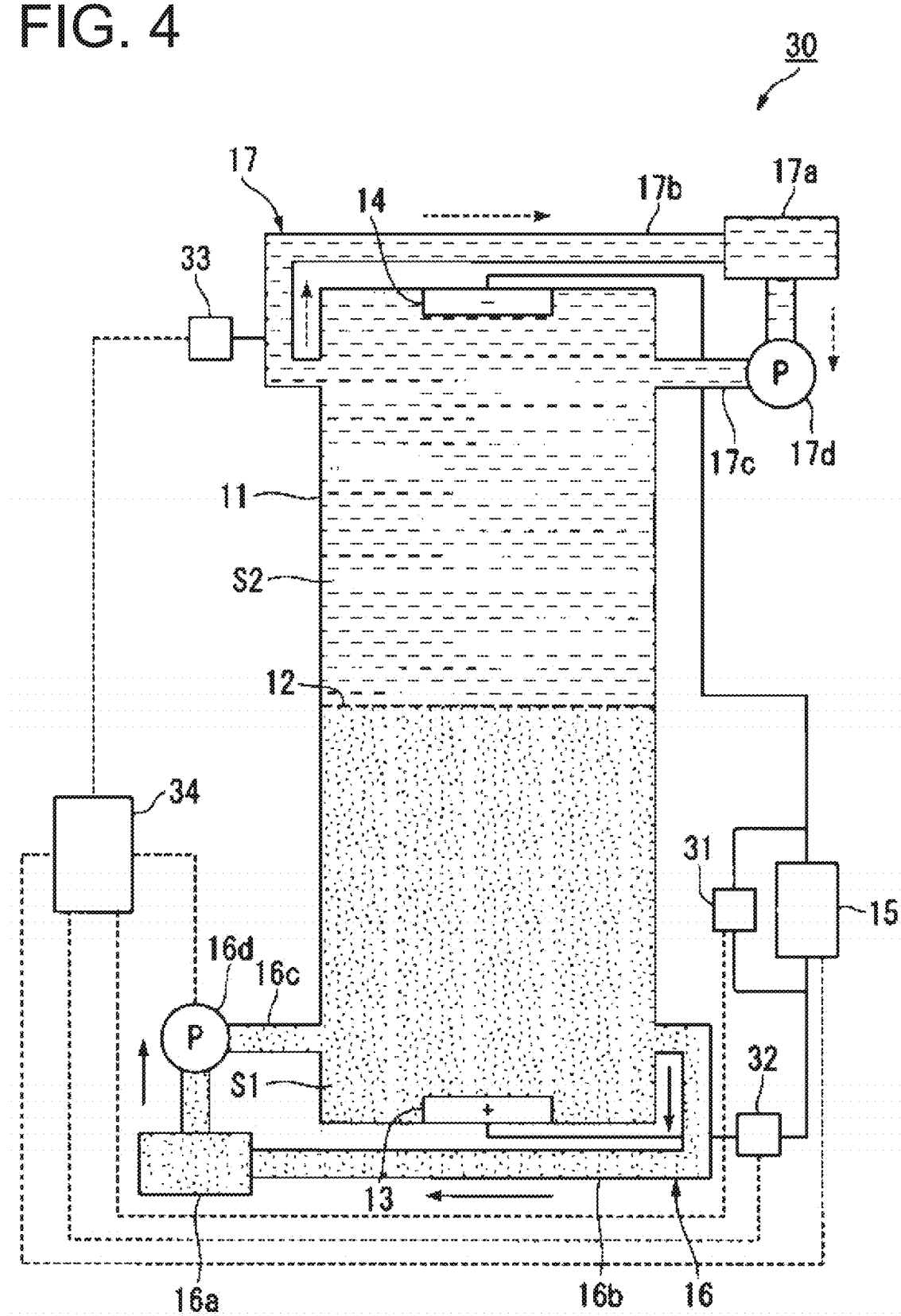
FIG. 4 is a schematic configuration diagram of an acidic treatment liquid processing apparatus according to a third embodiment.

FIG. 4 is a schematic configuration diagram of an acidic treatment liquid processing apparatus 30 according to the third embodiment.

The acidic treatment liquid processing apparatus 30 includes a tank 11, a diaphragm 12, a first electrode 13, a second electrode 14, a power supply 15, a first liquid passing part 16, a second liquid passing part 17, a voltmeter 31, an ammeter 32, a sensor 33, and a control part 34.

The acidic treatment liquid processing apparatus 30 is the same as the acidic treatment liquid processing apparatus 10 of the first embodiment except that the voltmeter 31, the ammeter 32, the sensor 33, and the control part 34 are further included.

The voltmeter 31 is a device for measuring the electric potential difference between the first electrode 13 and the second electrode 14, and is connected electrically parallel to the power supply 15. The voltmeter 31 measures the electric potential difference between the first electrode 13 and the second electrode 14 and outputs an electrical signal indicating the measurement value.

The ammeter 32 is a device for measuring the current output from the power supply 15, and is connected electrically in series with the first electrode 13 side of the power supply 15. The ammeter 32 measures the output current of the power supply 15 and outputs an electrical signal indicating the measurement value.

The sensor 33 is a device for measuring the color or temperature of liquid, and is disposed on the second liquid passing part 17. The sensor 33 measures the color or temperature of the acid aqueous solution in the second liquid passing part 17 and outputs an electrical signal indicating the measurement value.

The voltmeter 31, the ammeter 32, and the sensor 33 are examples of a data acquisition part configured to acquire data indicating the breaking state of the diaphragm 12.

If the diaphragm 12 breaks during the processing of the acidic treatment liquid, the measurement values of the voltmeter 31, the ammeter 32, and the sensor 33 change. For example, the acidic treatment liquid containing dichromate ions is black, and when the acidic treatment liquid is mixed into the acid aqueous solution due to the breakage of the diaphragm 12, the transparency of the acid aqueous solution decreases.

The control part 34 is configured to receive the electrical signals output from the voltmeter 31, the ammeter 32, and the sensor 33, and control the power supply 15 and the first liquid passing part 16. The control part 34 is electrically connected to the voltmeter 31, the ammeter 32, the sensor 33, the power supply 15, and the pump 16d of the first liquid passing part 16.

The control part 34 determines whether the diaphragm 12 breaks based on the electrical signals input from the voltmeter 31, the ammeter 32, and the sensor 33 (values acquired by the voltmeter 31, the ammeter 32, and the sensor 33 and change rates of the values), and if it is determined that the diaphragm 12 breaks, stops the applying of the voltage by the power supply 15 and the passing of the acidic treatment liquid by the first liquid passing part 16 (the operation of the pump 16d). If it is determined that the diaphragm 12 does not break, the applying of the voltage by the power supply 15 and the passing of the acidic treatment liquid by the first liquid passing part 16 continue.

The acidic treatment liquid processing apparatus 30 is used for processing the acidic treatment liquid containing dichromate ions and metal cations, as with the acidic treatment liquid processing apparatus 10.

The processing of the acidic treatment liquid using the acidic treatment liquid processing apparatus 30 can be performed in the same way as the processing of the acidic treatment liquid using the acidic treatment liquid processing apparatus 10 except that, during the processing, data indicating the breaking state of the diaphragm 12 is acquired by the voltmeter 31, the ammeter 32, and the sensor 33, it is determined whether the diaphragm 12 breaks based on the acquired data, and if it is determined that the diaphragm 12 breaks, the applying of the voltage and the passing of the acidic treatment liquid are stopped.

With the acidic treatment liquid processing method according to this embodiment, as with the first embodiment, it is possible to remove metal cations in the acidic treatment liquid without reducing hexavalent chromium and nitric acid. Further, in the second chamber S2, it is possible to remove metal cations moved to the acid aqueous solution by the electrolytic precipitation method. Alternatively, as with the second embodiment, the third electrode 21, the fourth electrode 22, and the second power supply 23 may be provided to remove metal cations moved to the acid aqueous solution by the electrolytic precipitation method in the acid aqueous solution storage tank 17a.

During the processing, the breakage of the diaphragm 12 is detected by the values measured by the voltmeter 31, the ammeter 32, and the sensor 33 and the change rates thereof. If the diaphragm 12 breaks, the application of the voltage may be automatically terminated, and the pumps 16d and 17d may be automatically stopped to stop the introduction of the acidic treatment liquid and the acid aqueous solution.

Fourth Embodiment

Next, the fourth embodiment of the present invention will be described with reference to the drawings.

Figure 5:
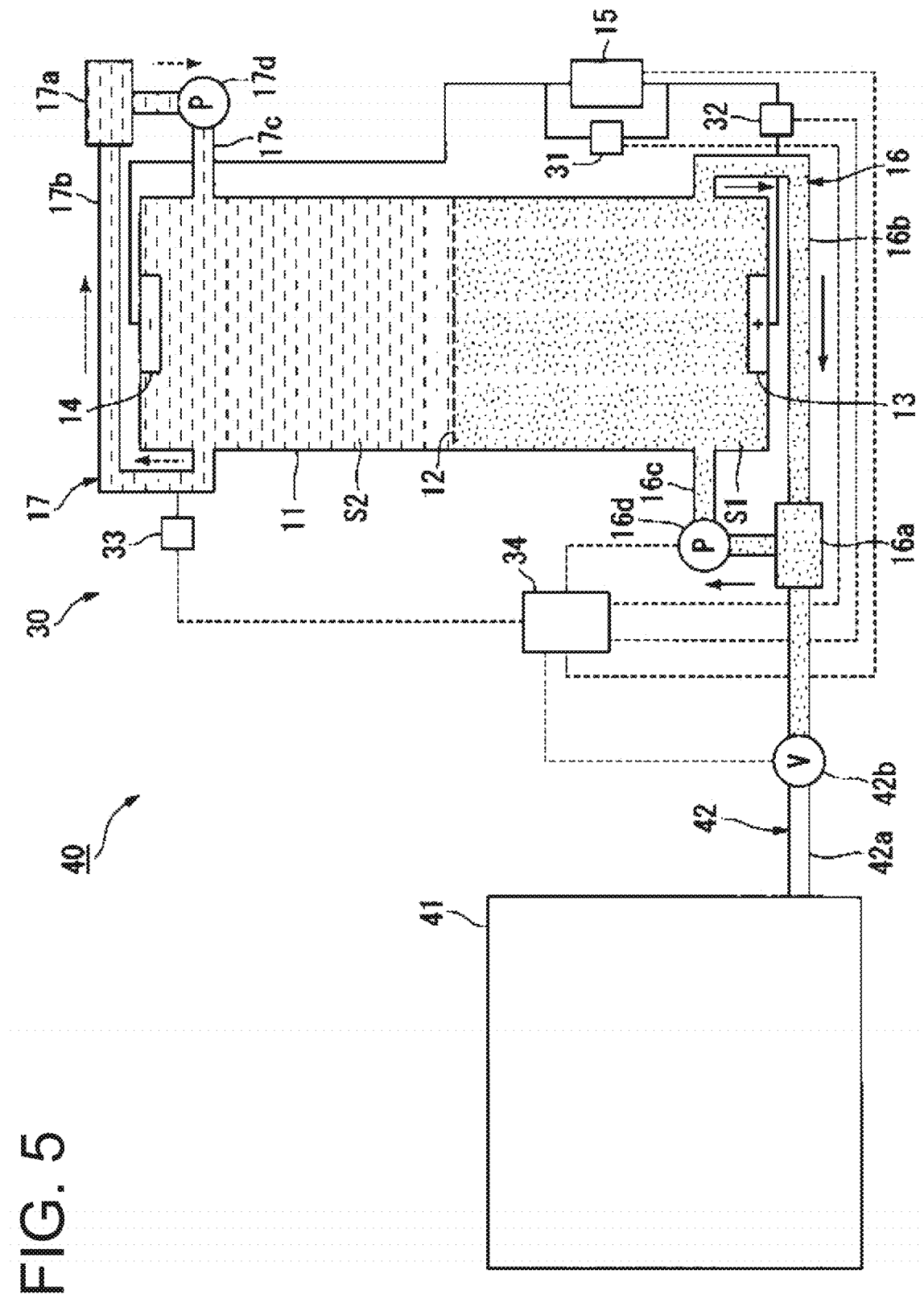
FIG. 5 is a schematic configuration diagram of a surface treatment system according to a fourth embodiment.

FIG. 5 is a schematic configuration diagram of a surface treatment system 40 according to the fourth embodiment.

The surface treatment system 40 includes the acidic treatment liquid processing apparatus 30, a surface treatment tank 41, and an acidic treatment liquid transfer part 42.

The surface treatment tank 41 stores the acidic treatment liquid containing dichromate ions for performing surface treatment of a metallic material using the acidic treatment liquid.

The acidic treatment liquid transfer part 42 includes a pipe 42a connecting the surface treatment tank 41 and the acidic treatment liquid storage tank 16a of the first liquid passing part 16, and a valve 42b disposed on the pipe 42a. The acidic treatment liquid transfer part 42 is configured to supply the acidic treatment liquid after being used for surface treatment in the surface treatment tank 41 from the surface treatment tank 41 to the first liquid passing part 16, and return the acidic treatment liquid processed by the acidic treatment liquid processing apparatus 30 from the first liquid passing part 16 to the surface treatment tank 41.

Further, the valve 42b and the control part 34 are electrically connected so that the valve 42b can be controlled by the control part 34.

In the present embodiment, the control part 34 determines whether the diaphragm 12 breaks based on the electrical signals input from the voltmeter 31, the ammeter 32, and the sensor 33, and if it is determined that the diaphragm 12 breaks, stops the applying of the voltage by the power supply 15 and the passing of the acidic treatment liquid by the first liquid passing part 16 (the operation of the pump 16d), and closes the valve 42b.

The acidic treatment liquid processing apparatus 10 is used for surface treatment of a metallic material.

The surface treatment by the surface treatment system 40 can be performed as follows. First, in the surface treatment tank 41, surface treatment of a metallic material is performed using the acidic treatment liquid containing dichromate ions. The acidic treatment liquid which has been used for the surface treatment contains dichromate ions and metal cations. This acidic treatment liquid is supplied to the first liquid passing part 16 and processed by the acidic treatment liquid processing apparatus 30. The processing by the acidic treatment liquid processing apparatus 30 can be performed in the same way as described above. Then, the acidic treatment liquid processed by the acidic treatment liquid processing apparatus 30 is returned to the surface treatment tank 41 and is reused for surface treatment of a metallic material. Then, the acidic treatment liquid used for surface treatment can be repeatedly processed and reused for surface treatment.

During the processing of the acidic treatment liquid using the acidic treatment liquid processing apparatus 30, data indicating the breaking state of the diaphragm 12 is acquired by the voltmeter 31, the ammeter 32, and the sensor 33, it is determined whether the diaphragm 12 breaks based on the acquired data, and if it is determined that the diaphragm 12 breaks, the applying of the voltage and the passing of the acidic treatment liquid are stopped, and the valve 42b is closed. Thus, the acidic treatment liquid processing apparatus 30 can be separated from the surface treatment tank 41, so that it is possible to prevent the acidic treatment liquid mixed with the acid aqueous solution due to a broken portion of the diaphragm 12 from being mixed in the surface treatment tank 41.

Fifth Embodiment

Next, the fifth embodiment of the present invention will be described with reference to the drawings.

Figure 6:
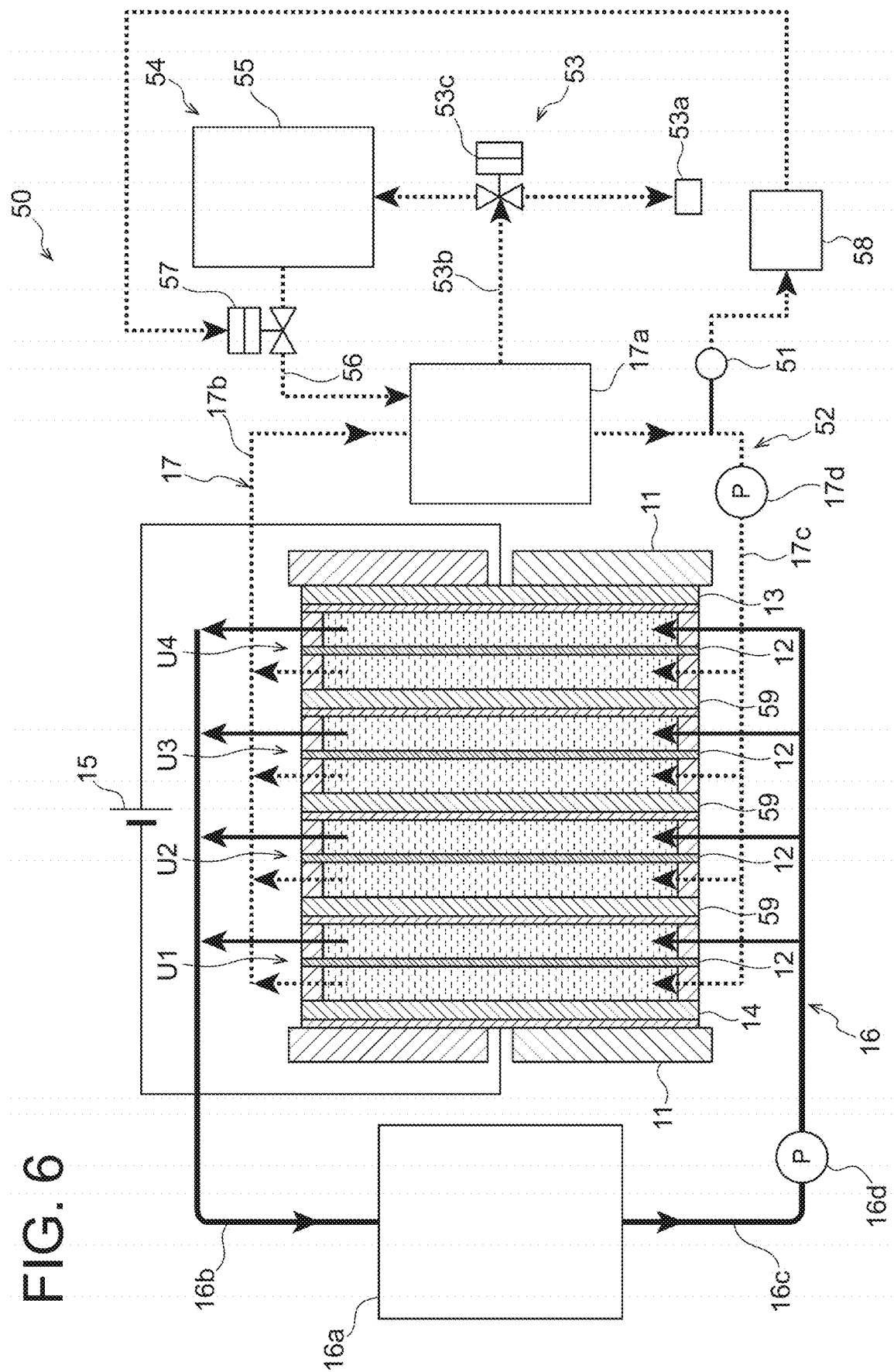
FIG. 6 is a schematic configuration diagram of an acidic treatment liquid processing apparatus according to a fifth embodiment.

FIG. 6 is a schematic configuration diagram of an acidic treatment liquid processing apparatus 50 according to the fifth embodiment.

The acidic treatment liquid processing apparatus 50 includes a tank 11, a diaphragm 12, a first electrode 13, a second electrode 14, a power supply 15, a first liquid passing part 16, a second liquid passing part 17, an acid concentration detection part 51, an acid aqueous solution supply part 54, and a discharge part 53.

In the following description, the same features in the above embodiment are associated with the same reference numerals, and not described again unless otherwise required.

In the acidic treatment liquid processing apparatus 50, as with each embodiment described above, the tank 11 has an interior space including the first chamber S1 and the second chamber S2 separated by the diaphragm 12. The first chamber S1 is supplied with the acidic treatment liquid stored in the acidic treatment liquid storage tank 16a by the first liquid passing part 16, and the second chamber S2 is supplied with the acid aqueous solution by the second liquid passing part 17.

In the present embodiment, particularly, fourth processing units U1 to U4, each of which is composed of the first chamber S1 and the second chamber S2 separated by the diaphragm 12, are arranged in series between the first electrode 13 and the second electrode 14, with an intermediate electrode 59 being interposed between the units. The acidic treatment liquid from the first liquid passing part 16 branches and is supplied to the first chamber S1 of each processing unit, and the acid aqueous solution from the second liquid passing part 17 branches and is supplied to the second chamber S2 of each processing unit.

Examples of the material of the intermediate electrode 59 include Pt, Pt-plated Ti, $PbO_2$-coated Ti, Ti, and $IrO_2$-coated Ti.

In the acidic treatment liquid processing apparatus 50, since the processing units U1 to U4 are arranged in series in the tank 11, it is possible to increase the processing capacity of the acidic treatment liquid while reducing the areas of the first electrode 13, the second electrode 14, and the intermediate electrode 59. Since the first electrode 13, the second electrode 14, and the intermediate electrode 59 are made of a relatively expensive material as described above, by reducing the areas, the cost required for the acidic treatment liquid processing apparatus 50 can be effectively reduced.

The second liquid passing part 17 has a circulation passage 52 including the acid aqueous solution storage tank 17a, the third pipe 17b, the fourth pipe 17c, the second chamber S2, and the pump 17d. In the circulation passage 52, a predetermined amount of the acid aqueous solution stored in the acid aqueous solution storage tank 17a is circulated, and as necessary, the acid aqueous solution is additionally supplied from the acid aqueous solution supply part 54.

The acid aqueous solution supply part 54 has a spare tank 55 previously storing the acid aqueous solution for additional supply outside the circulation passage 52 as a supply source of the acid aqueous solution to the circulation passage 52. The acid aqueous solution stored in the spare tank 55 can be additionally supplied to the circulation passage 52 via a supply line 56 connecting the spare tank 55 and the circulation passage 52. Such supply of the acid aqueous solution is performed by opening and closing a supply valve 57 disposed on the supply line 56.

Thus, the acid aqueous solution can be additionally supplied to the acid aqueous solution circulating in the second chamber S2 from the outside by the acid aqueous solution supply part 54. Accordingly, even if the acid concentration in the acid aqueous solution in the second chamber S2 decreases with the progress of the processing reaction in the tank 11, and the processing performance deteriorates, by additionally supplying the acid aqueous solution from the outside, the acid concentration can be increased to recover or maintain the processing performance. As a result, it is possible to reduce the consumption of the acid aqueous solution in the circulation passage 52 and reduce the frequency of replacement, thereby reducing the cost. Further, when the acid concentration in the acid aqueous solution decreases, the voltage between the first electrode 13 and the second electrode 14 increases, but the voltage between the first electrode 13 and the second electrode 14 can also be reduced by additionally supplying the acid aqueous solution to increase the acid concentration as described above. This reduces the power consumption of the power supply 15, thus being effective in reducing the power cost.

Additionally, in the fifth embodiment, the acid concentration of the acid aqueous solution in the second chamber S2 is detected by the acid concentration detection part 51. The acid concentration detected by the acid concentration detection part 51 is sent as an electrical signal to a supply control part 58. The supply control part 58 is, for example, a control unit composed of an electronic computing device such as a computer, and controls the acid aqueous solution supply part 54 to adjust the additional supply amount of the acid aqueous solution such that the acid concentration detected by the acid concentration detection part 51 is within a predetermined acid concentration range. As a result, the acid concentration of the acid aqueous solution circulating in the second chamber S2 is maintained in the predetermined acid concentration range, so that it is possible to maintain a suitable processing performance for a long time.

Additionally, in the fifth embodiment, the acid aqueous solution circulating in the circulation passage 52 can be discharged to the outside by the discharge part 53. The discharge part 53 has a discharge line 53b communicating with a discharge port 53a or the acid aqueous solution storage tank 17a, and a discharge valve 53c disposed on the discharge line 53b.

At the normal time, in the acidic treatment liquid processing apparatus 50, the discharge valve 53c is closed to prevent the acid aqueous solution flowing through the circulation passage 52 from leaking to the outside, whereas at the discharge time, the discharge valve 53c is opened to discharge the acid aqueous solution flowing through the circulation passage 52 via the discharge line 53b. Since the discharge valve 53c is a three-way valve, the acid aqueous solution flowing through the discharge line 53b may be discharged to the outside from the discharge port 53a, or may be discharged so as to be returned to the acid aqueous solution storage tank 17a. Thus, even if the volume of the acid aqueous solution circulating in the circulation passage 52 is increased by supplying the acid aqueous solution from the outside to the circulation passage 52 by the acid aqueous solution supply part 54, the volume of the acid aqueous solution circulating in the circulation passage 52 can be appropriately adjusted by discharging at least a part of the solution to the outside.

The operation of discharging the acid aqueous solution by the discharge part 53 may be performed manually by the operator, or may be performed by automatic control. In the latter case, for example, the volume of the acid aqueous solution flowing through the circulation passage 52 may be monitored, and control may be performed so that the discharge operation is performed when the volume exceeds a predetermined volume.

Sixth Embodiment

Next, the sixth embodiment of the present invention will be described with reference to the drawings.

Figure 7:
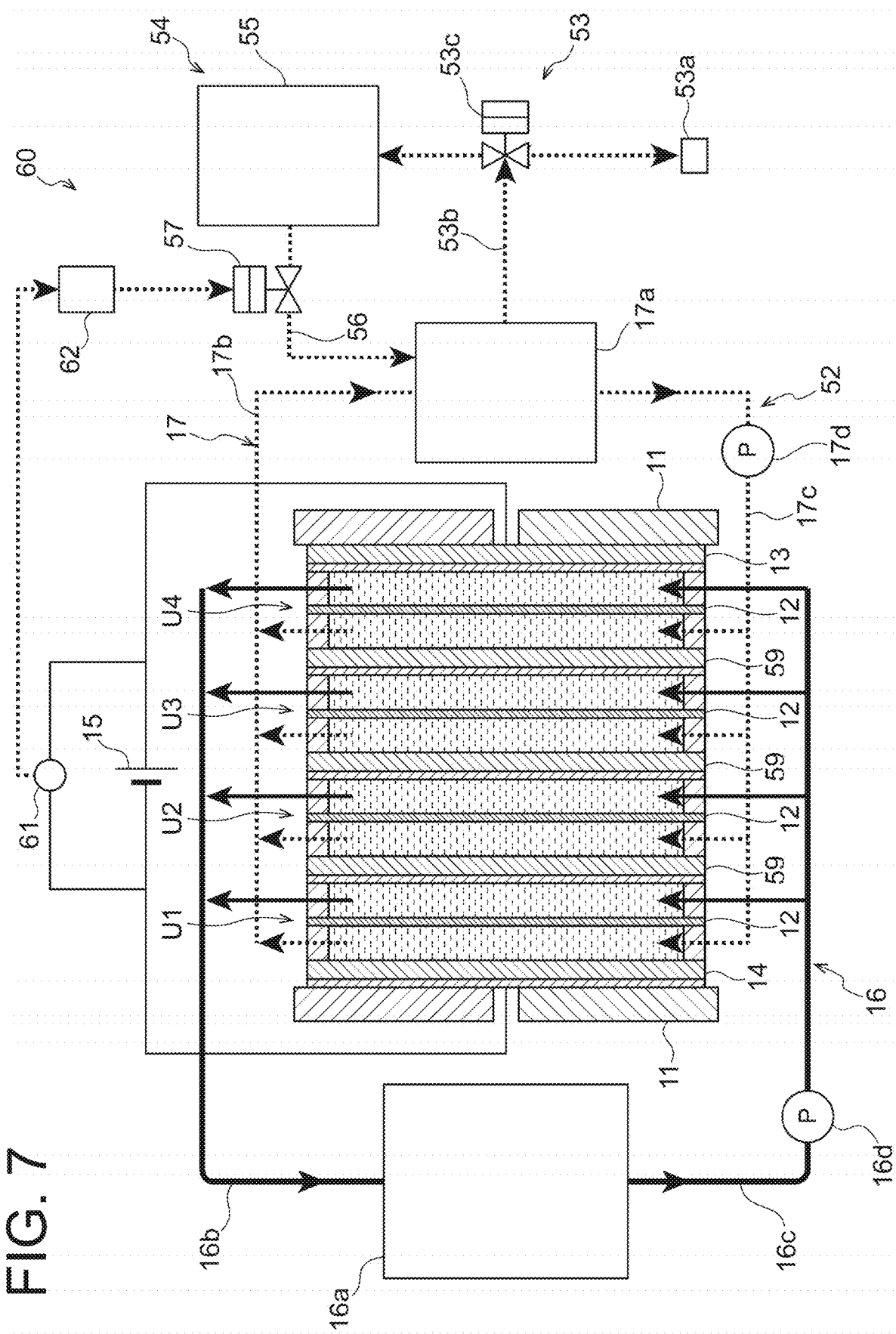
FIG. 7 is a schematic configuration diagram of an acidic treatment liquid processing apparatus according to a sixth embodiment.

FIG. 7 is a schematic configuration diagram of an acidic treatment liquid processing apparatus 60 according to the sixth embodiment.

The acidic treatment liquid processing apparatus 60 includes a tank 11, a diaphragm 12, a first electrode 13, a second electrode 14, a power supply 15, a first liquid passing part 16, a second liquid passing part 17, a voltage detection part 61, an acid aqueous solution supply part 54, and a discharge part 53.

In the following description, the same features in the above embodiment are associated with the same reference numerals, and not described again unless otherwise required.

In the sixth embodiment, the voltage between the first electrode 13 and the second electrode 14 is detected by the voltage detection part 61. The voltage between the electrodes detected by the voltage detection part 61 is sent as an electrical signal to a supply control part 62. The supply control part 62 is, for example, a control unit composed of an electronic computing device such as a computer, and controls the acid aqueous solution supply part 54 to adjust the additional supply amount of the acid aqueous solution such that the voltage between the electrodes detected by the voltage detection part 61 is not greater than a predetermined voltage value. Thus, the amount of the acid aqueous solution additionally supplied from the outside is controlled based on the voltage between the first electrode 13 and the second electrode 14. As a result, it is possible to avoid an increase in power consumption due to the voltage between the first electrode 13 and the second electrode 14 becoming greater than the predetermined voltage value, so that it is possible to effectively reduce the power cost required for processing.

Seventh Embodiment

Next, the seventh embodiment of the present invention will be described with reference to the drawings.

Figure 8:
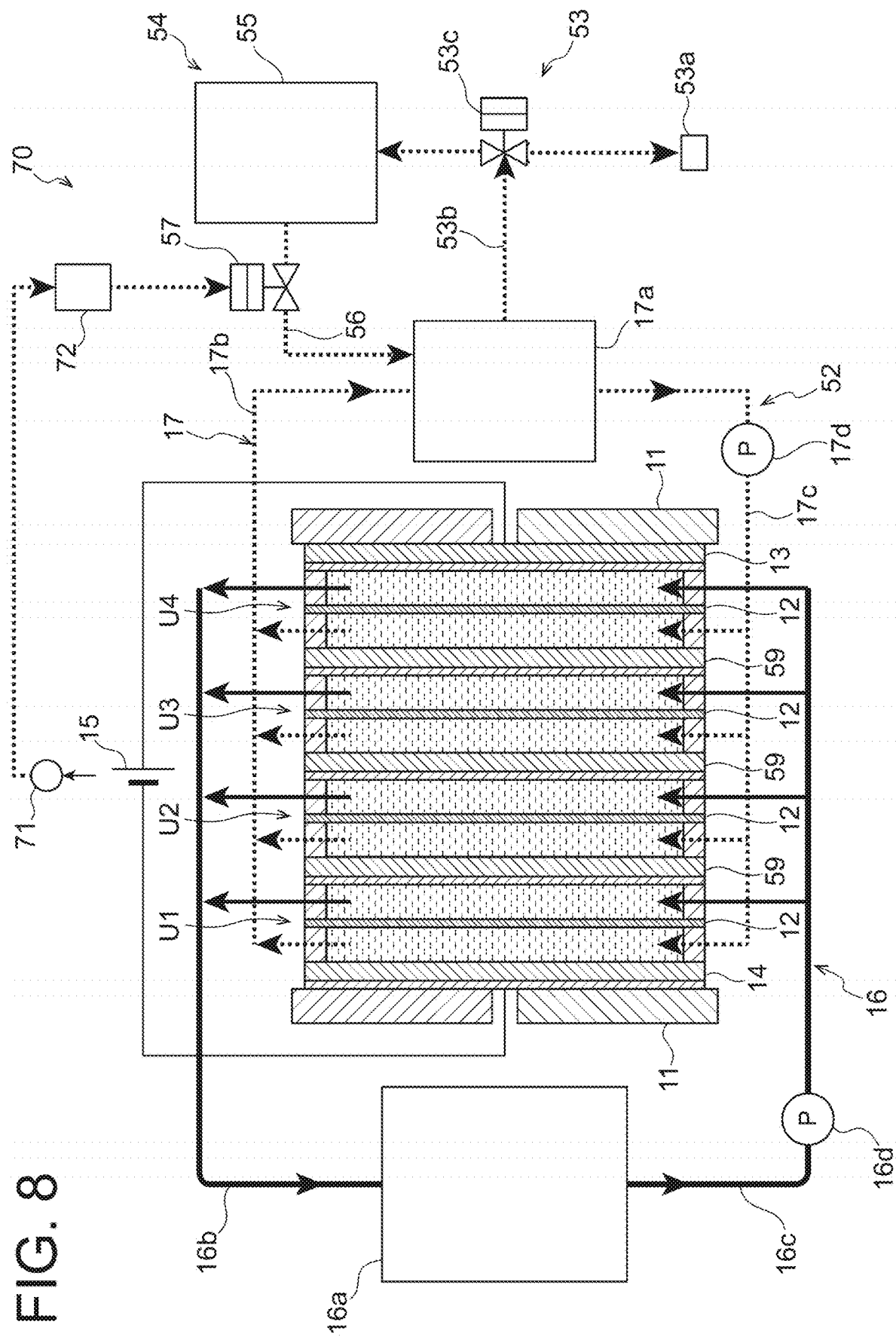
FIG. 8 is a schematic configuration diagram of an acidic treatment liquid processing apparatus according to a seventh embodiment.

FIG. 8 is a schematic configuration diagram of an acidic treatment liquid processing apparatus 70 according to the seventh embodiment.

The acidic treatment liquid processing apparatus 60 includes a tank 11, a diaphragm 12, a first electrode 13, a second electrode 14, a power supply 15, a first liquid passing part 16, a second liquid passing part 17, an energization time counting part 71, an acid aqueous solution supply part 54, and a discharge part 53.

In the following description, the same features in the above embodiment are associated with the same reference numerals, and not described again unless otherwise required.

In the seventh embodiment, the energization time of the power supply 15 is counted by the energization time counting part 71. The energization time counted by the energization time counting part 71 is sent as an electrical signal to a supply control part 72. The supply control part 72 is, for example, a control unit composed of an electronic computing device such as a computer, and controls the acid aqueous solution supply part 54 such that additional supply of the acid aqueous solution starts when the energization time counted by the energization time counting part 71 exceeds a predetermined time. Thus, the operation of supplying the acid aqueous solution from the outside by the acid aqueous solution supply part 54 is controlled based on the energization time of the power supply 15. Thereby, when the acid concentration in the acid aqueous solution is expected to decrease as the energization time exceeds the predetermined time, a new acid aqueous solution is supplied from the outside to the acid aqueous solution circulating in the second chamber S2. As a result, the processing performance can be appropriately maintained, the increase in the voltage between the electrodes can be suppressed, and the power cost can be suitably reduced.

Eighth Embodiment

Next, the eighth embodiment of the present invention will be described with reference to the drawings.

Figure 9:
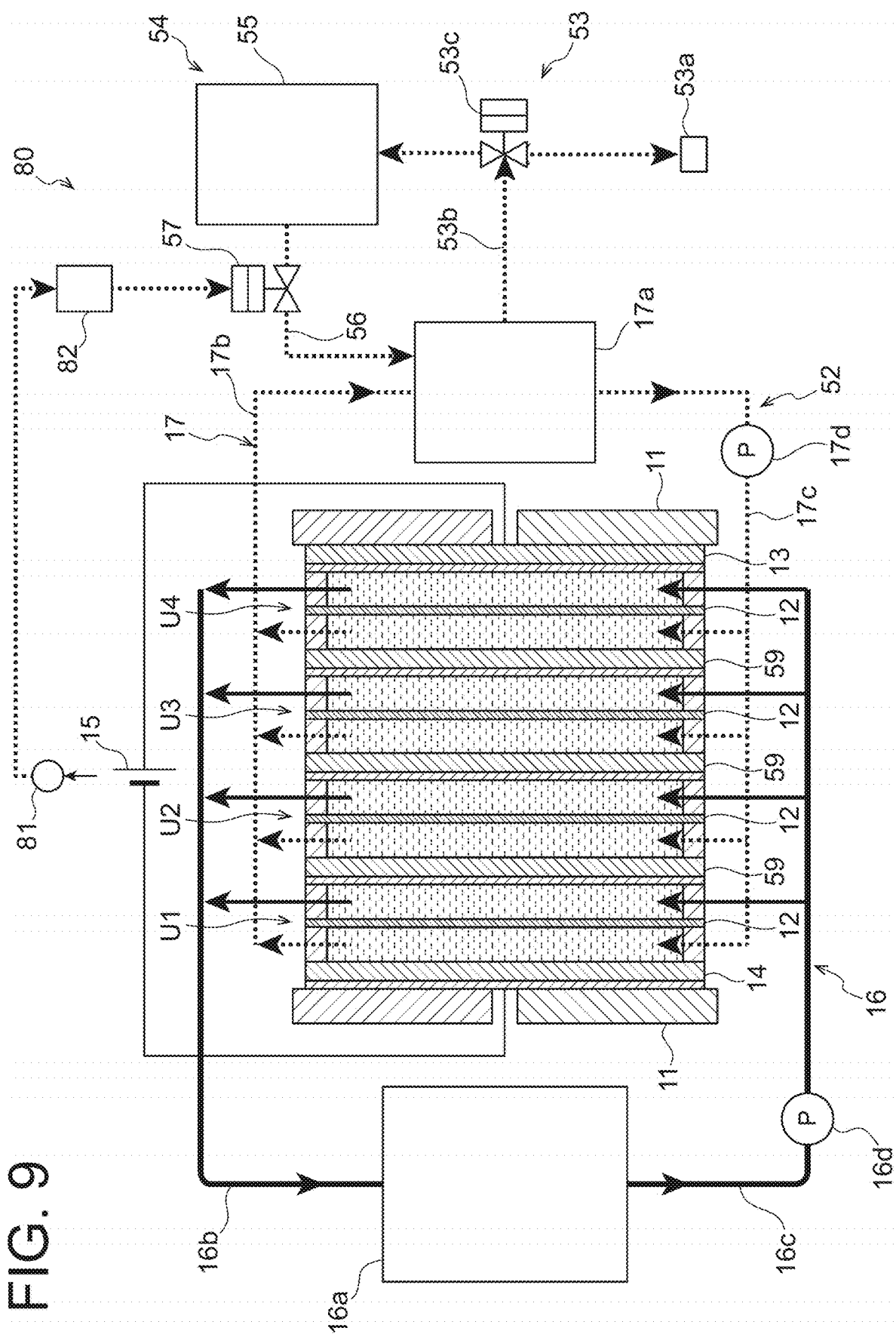
FIG. 9 is a schematic configuration diagram of an acidic treatment liquid processing apparatus according to an eighth embodiment.

FIG. 9 is a schematic configuration diagram of an acidic treatment liquid processing apparatus 80 according to the eighth embodiment.

The acidic treatment liquid processing apparatus 60 includes a tank 11, a diaphragm 12, a first electrode 13, a second electrode 14, a power supply 15, a first liquid passing part 16, a second liquid passing part 17, a cumulative energization amount detection part 81, an acid aqueous solution supply part 54, and a discharge part 53.

In the following description, the same features in the above embodiment are associated with the same reference numerals, and not described again unless otherwise required.

In the eighth embodiment, the cumulative energization amount of the power supply 15 is detected by the cumulative energization amount detection part 81. The cumulative energization amount detected by the cumulative energization amount detection part 81 is sent as an electrical signal to a supply control part 82. The supply control part 82 is, for example, a control unit composed of an electronic computing device such as a computer, and controls the acid aqueous solution supply part 54 such that additional supply of the acid aqueous solution starts when the cumulative energization amount detected by the cumulative energization amount detection part 81 exceeds a predetermined energization amount. Thereby, when the acid concentration in the acid aqueous solution is expected to decrease as the energization amount exceeds the predetermined energization amount, a new acid aqueous solution is supplied from the outside to the acid aqueous solution circulating in the second chamber S2. As a result, the processing performance can be appropriately maintained, the increase in the voltage between the electrodes can be suppressed, and the power cost can be suitably reduced.

In the fifth to eighth embodiments, as described above, the acid aqueous solution supply part 54 additionally supplies the acid aqueous solution to the circulation passage 52, or the discharge part 53 discharges the acid aqueous solution from the circulation passage 52. However, when sulfuric acid is used as acid in the acid aqueous solution, these configurations may be omitted. Sulfuric acid is hardly consumed by the reduction reaction at the second electrode 14, which is the cathode. Therefore, it is less consumed than an acid aqueous solution such as nitric acid, which is consumed by the reduction reaction at the second electrode 14, so that it is possible to maintain a stable processing performance for a long time even if the acid aqueous solution is not additionally supplied or discharged as described above.

Ninth Embodiment

Next, the ninth embodiment of the present invention will be described with reference to the drawings.

Figure 10:
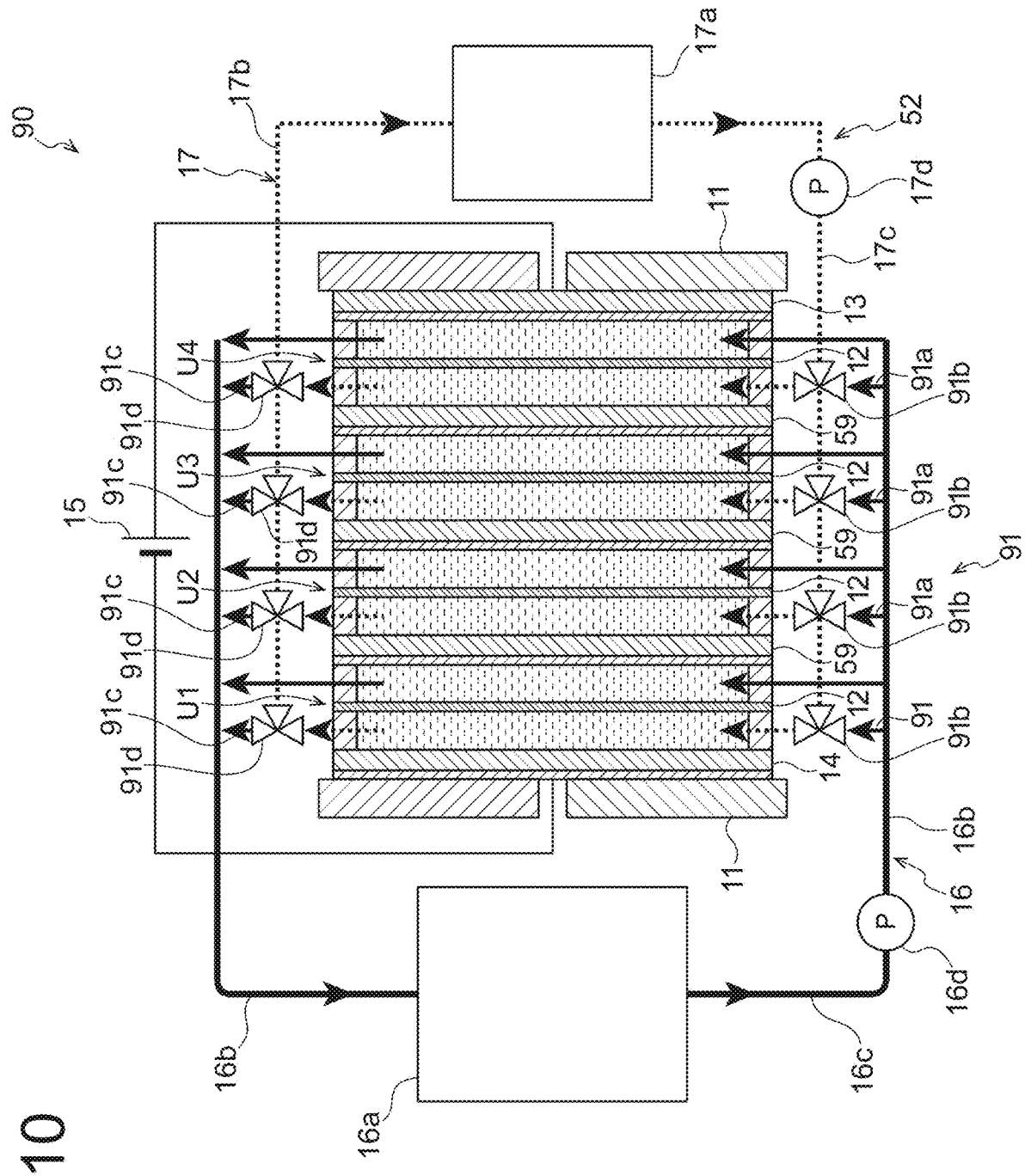
FIG. 10 is a schematic configuration diagram of an acidic treatment liquid processing apparatus according to a ninth embodiment.

FIG. 10 is a schematic configuration diagram of an acidic treatment liquid processing apparatus 90 according to the ninth embodiment.

The acidic treatment liquid processing apparatus 90 includes a tank 11, a diaphragm 12, a first electrode 13, a second electrode 14, a power supply 15, a first liquid passing part 16, a second liquid passing part 17, and a third liquid passing part 91.

In the following description, the same features in the above embodiment are associated with the same reference numerals, and not described again unless otherwise required.

In the processing reaction in the tank 11, precipitates are formed on the surface of the second electrode 14, which is the cathode, and the processing performance deteriorates as the deposition amount of the precipitates increases. However, when the acidic treatment liquid is fed into the second chamber S2 by the third liquid passing part 91, the precipitates can be dissolved. The third liquid passing part 91 includes a supply line 91a communicating from the second pipe 16c of the first liquid passing part 16 to each second chamber S2, a supply valve 91b disposed on each supply line 91a, a recovery line 91c communicating from each second chamber S2 to the first liquid passing part 16b to recover the acidic treatment liquid having passed through each second chamber S2, and a recovery valve 91d disposed on each recovery line 91.

When the precipitate on the second electrode 14 is hydroxide, dissolution occurs by the following reaction when an acidic treatment solution containing dichromic acid (hexavalent chromium) and nitric acid is used.

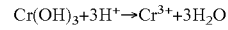
$Cr(OH)_3 + 3H^+ \rightarrow Cr^{3+} + 3H_2O$

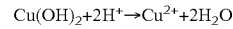
$Cu(OH)_2 + 2H^+ \rightarrow Cu^{2+} + 2H_2O$

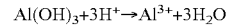
$Al(OH)_3 + 3H^+ \rightarrow Al^{3+} + 3H_2O$

When the precipitate is metal, dissolution occurs by the following redox reaction.

$2Cr + Cr_2O_7^{2-} + 14H^+ \rightarrow 4Cr^{3+} + 7H_2O$

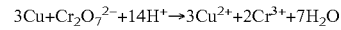
$3Cu + Cr_2O_7^{2-} + 14H^+ \rightarrow 3Cu^{2+} + 2Cr^{3+} + 7H_2O$

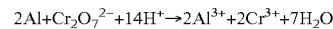
$2Al + Cr_2O_7^{2-} + 14H^+ \rightarrow 2Al^{3+} + 2Cr^{3+} + 7H_2O$

When the acidic treatment liquid is fed into the second chamber S2, the precipitates can be dissolved, and the processing performance can be suitably maintained. Further, for example, by disassembling the tank and polishing the electrode surface, it is possible to eliminate the operation of removing (cleaning) the precipitates, so that the handling is easy.

The liquid passing operation by the third liquid passing part 91 may be performed as a part of maintenance different from the normal operation in order to dissolve the precipitates. As a result, when the liquid is passed by the third liquid passing part 91, it is possible to reduce the mixing of the acidic treatment liquid supplied to the second chamber S2 with the acid aqueous solution stored in the second chamber S2 during the normal operation.

The operation of passing the acidic treatment liquid into the second chamber S2 by the third liquid passing part 91 may be performed, for example, when the precipitates on the second electrode 14 exceeds a predetermined amount. Specifically, normal operation may continue until the amount of precipitates on the second electrode 14 reaches the predetermined value, and when it is determined that the amount of precipitates reaches the predetermined amount, so the precipitates are sufficiently accumulated, the liquid may be fed by the third liquid passing part 91. As a result, a predetermined amount of precipitates on the second electrode 14 can be dissolved together, so that the number of liquid passing operations by the third liquid passing part 91 can be reduced to a degree that does not become complicated.

The predetermined amount may be adjusted to such an extent that the number of liquid passing operations by the third liquid passing part 91 does not become too large and the processing performance in the second chamber S2 does not deteriorate too much.

Before the acidic treatment liquid is passed into the second chamber S2 by the third liquid passing part 91, the second chamber S2 may be emptied by discharging the acid aqueous solution stored in the second chamber S2 in advance. When the acidic treatment liquid is passed into the empty second chamber S2, it is possible to dissolve the precipitates on the second electrode 14 more quickly and prevent the acidic treatment liquid and the acid aqueous solution from being mixed.

Tenth Embodiment

Next, the tenth embodiment of the present invention will be described with reference to the drawings.

Figure 11:
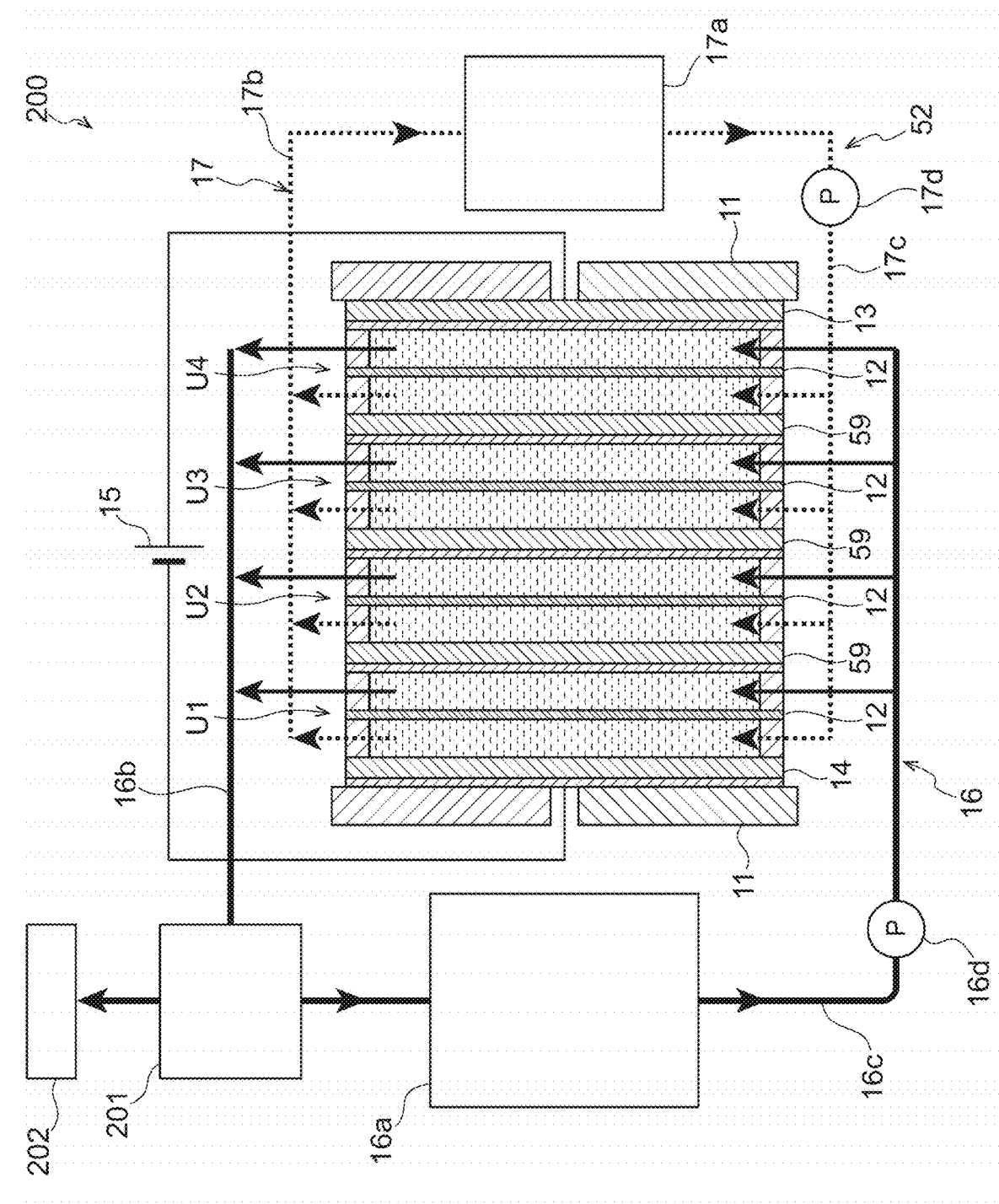
FIG. 11 is a schematic configuration diagram of an acidic treatment liquid processing apparatus according to a tenth embodiment.

FIG. 11 is a schematic configuration diagram of an acidic treatment liquid processing apparatus 200 according to the tenth embodiment.

The acidic treatment liquid processing apparatus 200 includes a tank 11, a diaphragm 12, a first electrode 13, a second electrode 14, a power supply 15, a first liquid passing part 16, a second liquid passing part 17, a component analysis part 201, and a display device 202.

In the following description, the same features in the above embodiment are associated with the same reference numerals, and not described again unless otherwise required.

The component analysis part 201 is a device for analyzing the component of the acidic treatment liquid discharged from the first chamber S1, and is disposed on the first pipe 16b connecting the first chamber S1 and the surface treatment tank 16a. The component analysis part 201 detects the concentration of each component such as hexavalent chromium and nitric acid contained in the acidic treatment liquid, for example. The analysis result of the component analysis part 201 is sent to the display device 202 (e.g., display) as an electrical signal and displayed on a monitor included in the display device 202.

Thus, in the tenth embodiment, the component analysis result of the processed acidic treatment liquid discharged from the first chamber S1 is displayed on the display device. Accordingly, the operator who monitors the display device 202 can take immediate action (e.g., apparatus shutdown) when an anomaly occurs (e.g., sudden increase in concentration of particular component).

Other Modified Examples

The embodiments of the present invention have been described above, but the present invention is not limited thereto. The configurations and combinations in the above-described embodiments are merely illustrative, and the configuration can be added, omitted, replaced, and other changes can be made without departing from the spirit of the present invention.

For example, in the acidic treatment liquid processing apparatus 10 according to the first embodiment, a plurality of tanks 11, diaphragms 12, first electrodes 13, and second electrodes 14 may be arranged in series or parallel with the surface treatment tank 16a. Of course, in the modified example shown in FIG. 2, a plurality of tanks 11, diaphragms 12, first electrodes 13, and second electrodes 14 may be arranged in series or parallel with the surface treatment tank 16a without using the bipolar membrane 12B. The same applies to the second, third, and fourth embodiments.

In the second, third, or fourth embodiment, as shown in FIG. 2, both the cation exchange membrane 12A and the bipolar membrane 12B may be used as the diaphragm 12.

The acidic treatment liquid processing apparatus 30 according to the third or fourth embodiment may further include the third electrode 21, the fourth electrode 22, and the second power supply 23 according to the second embodiment.

EXAMPLES

The present invention will be described in details with reference to examples. However, the present invention is not limited thereto.

Example 1

The acidic treatment liquid was processed under the following conditions using the acidic treatment liquid treatment apparatus having the configuration shown in FIG. 1. During the processing, the hexavalent chromium concentration, the copper ion concentration, and the aluminum ion concentration in the acidic treatment liquid were measured by the following measuring methods, respectively.

Diaphragm 12: Electrolytic membrane having a thickness of 200 μm

Acid aqueous solution: Nitric acid aqueous solution having a concentration of 10% by mass Acidic treatment liquid: Acidic treatment liquid after being used for surface treatment of aluminum alloy, having a nitric acid concentration of 10% by mass, a dichromate ion concentration of 50% by mass, a copper ion concentration of 0.1% by mass First electrode 13: $PbO_2$-coated Ti Second electrode 14: Ti Current density: 4.1 A/dm$^2$ Method for measuring hexavalent chromium concentration: Redox titration Method for measuring copper ion concentration: Radiofrequency inductively coupled plasma emission spectroscopy (ICP)

Method for measuring copper aluminum concentration: ICP

Comparative Example 1

Figure 12:
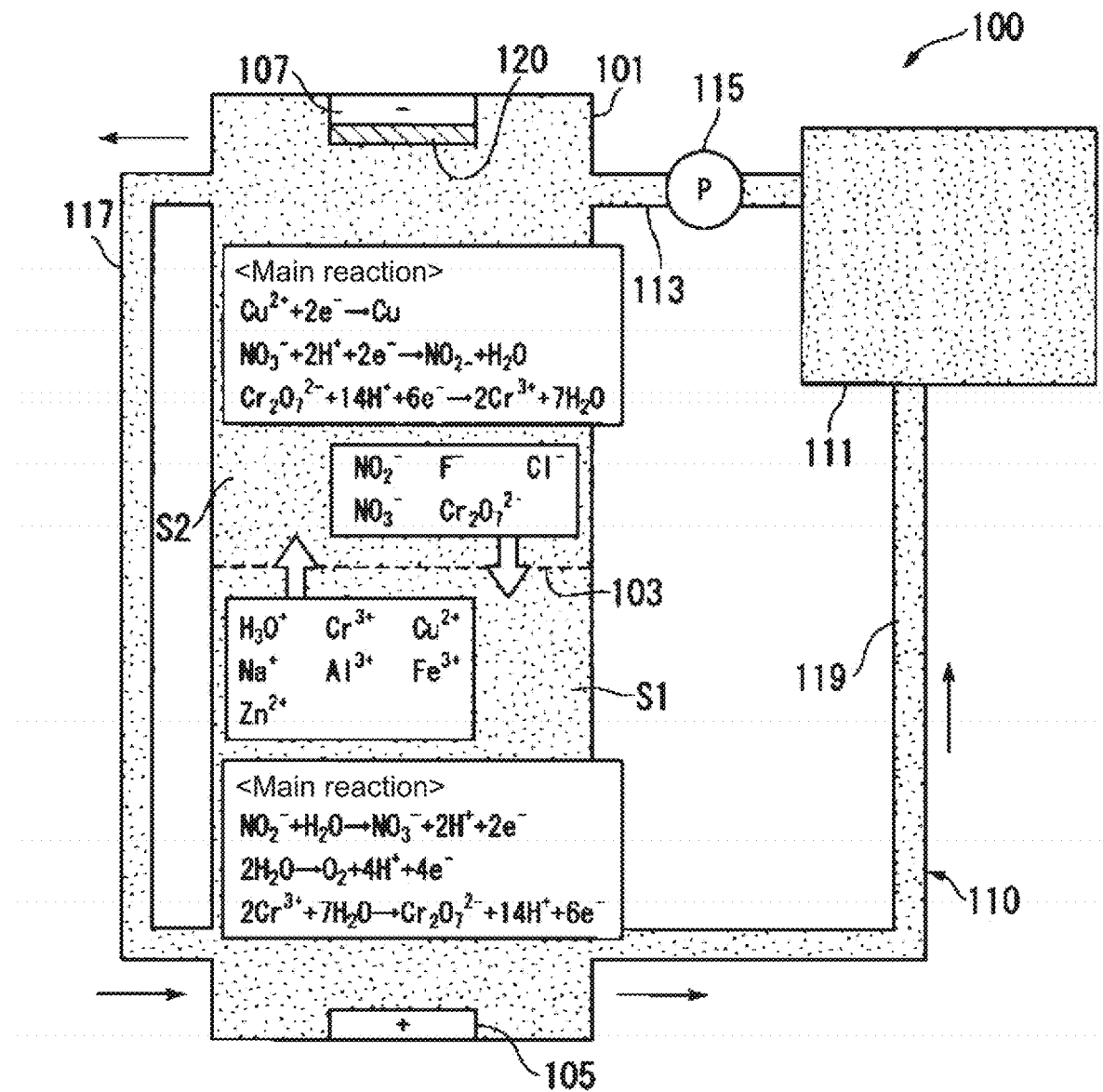
FIG. 12 is a schematic configuration diagram of an acidic treatment liquid processing apparatus using an electrolytic precipitation method.

The acidic treatment liquid was processed under the following conditions using the acidic treatment liquid treatment apparatus having the configuration shown in FIG. 12. During the processing, the hexavalent chromium concentration, the copper ion concentration, and the aluminum ion concentration in the acidic treatment liquid were measured by the above measuring methods, respectively.

Figure 13:
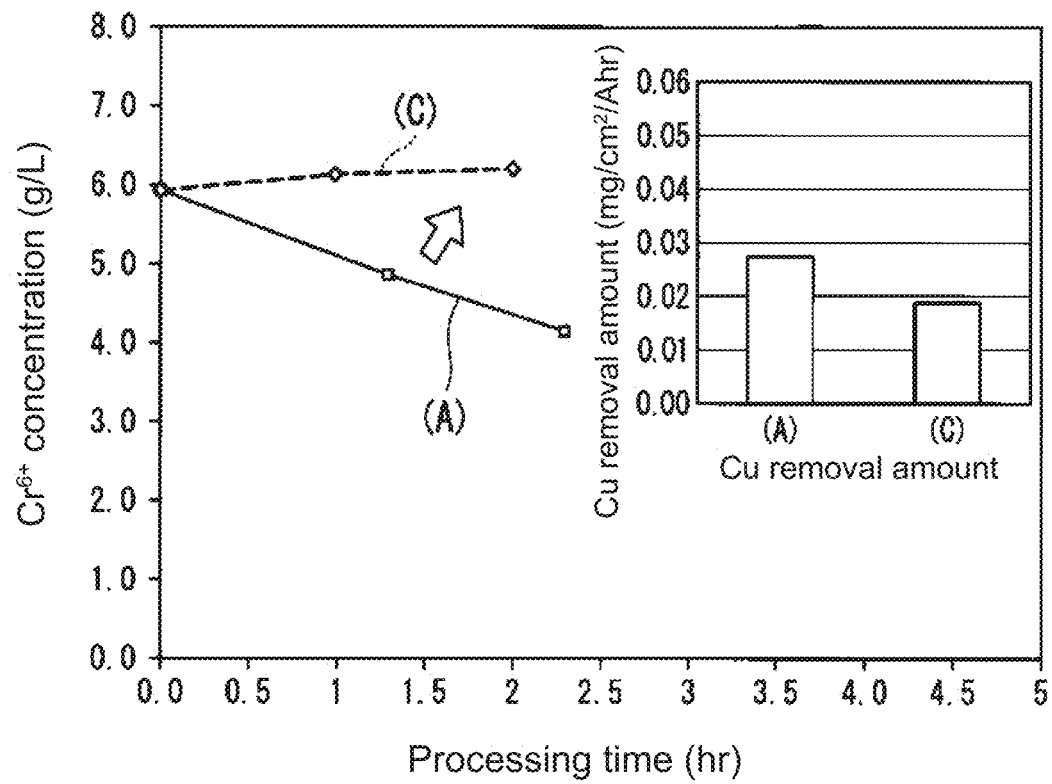
FIG. 13 is a graph showing the temporal change in concentration of hexavalent chromium ($Cr^{6+}$) in the acidic treatment liquid, and the removal amount of copper ions (Cu removal amount) from the acidic treatment liquid in Example 1 (C) and Comparative Example 1 (A).
Figure 14:
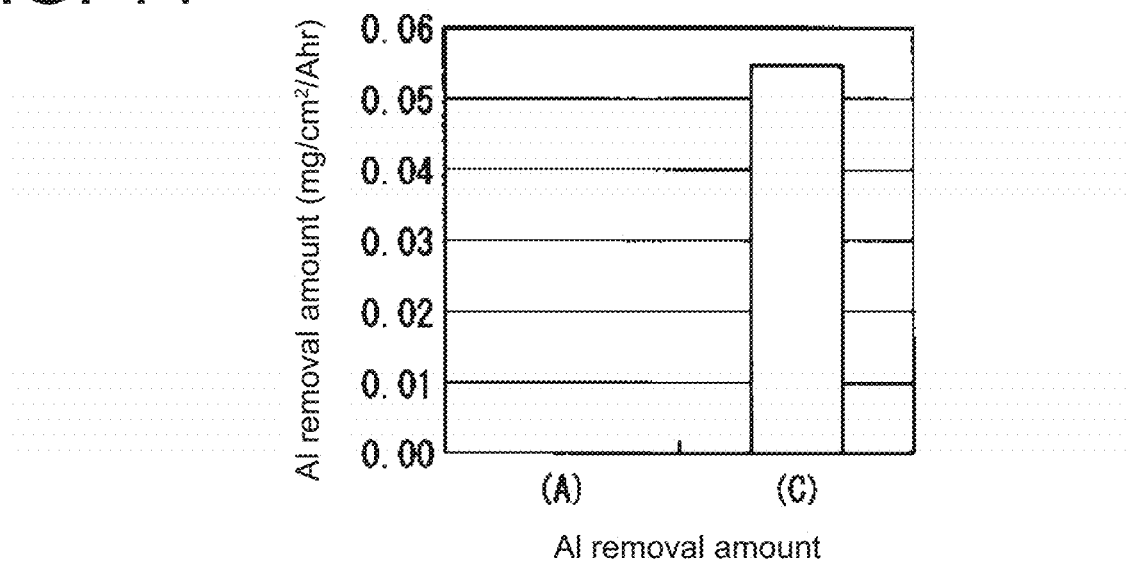
FIG. 14 is a graph showing the removal amount of aluminum ions (Al removal amount) from the acidic treatment liquid in Example 1 (C) and Comparative Example 1 (A).

Diaphragm 103: Same as Example 1
Acidic treatment liquid: Same as Example 1
Anode 105: Same as Example 1
Cathode 107; Pt-plated Ti
Current density: 20 A/dm$^2$ The results of Example 1 and Comparative Example 1 are shown in FIGS. 13 and 14. FIG. 13 is a graph where the horizontal axis represents the processing time (hr) and the vertical axis represents the hexavalent chromium concentration, and a graph showing the amount of copper ions removed from the acidic treatment liquid (Cu removal amount) 2 hours after the processing starts. FIG. 14 is a graph showing the amount of aluminum ions removed from the acidic treatment liquid (Al removal amount) 2 hours after the processing starts. In the graphs, (C) represents Example 1, and (A) represents Comparative Example 1.

As shown in the above results, in Example 1, copper ions and aluminum ions could be removed without reducing the hexavalent chromium concentration.

In Comparative Example 1, the hexavalent chromium concentration was reduced. Further, aluminum ions could not be removed.

Figure 15:
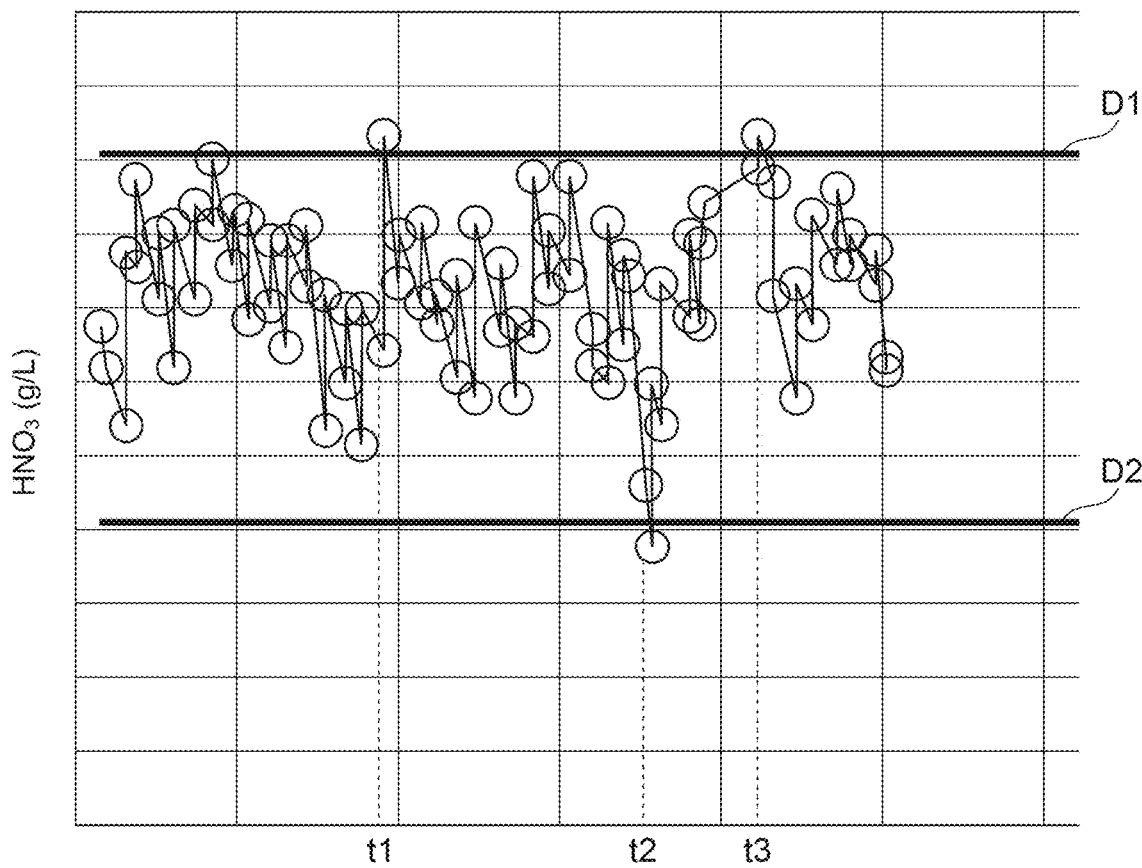
FIG. 15 is a display example of the display device regarding the nitric acid concentration in the acidic treatment liquid detected by the component analysis part according to the tenth embodiment.
Figure 16:
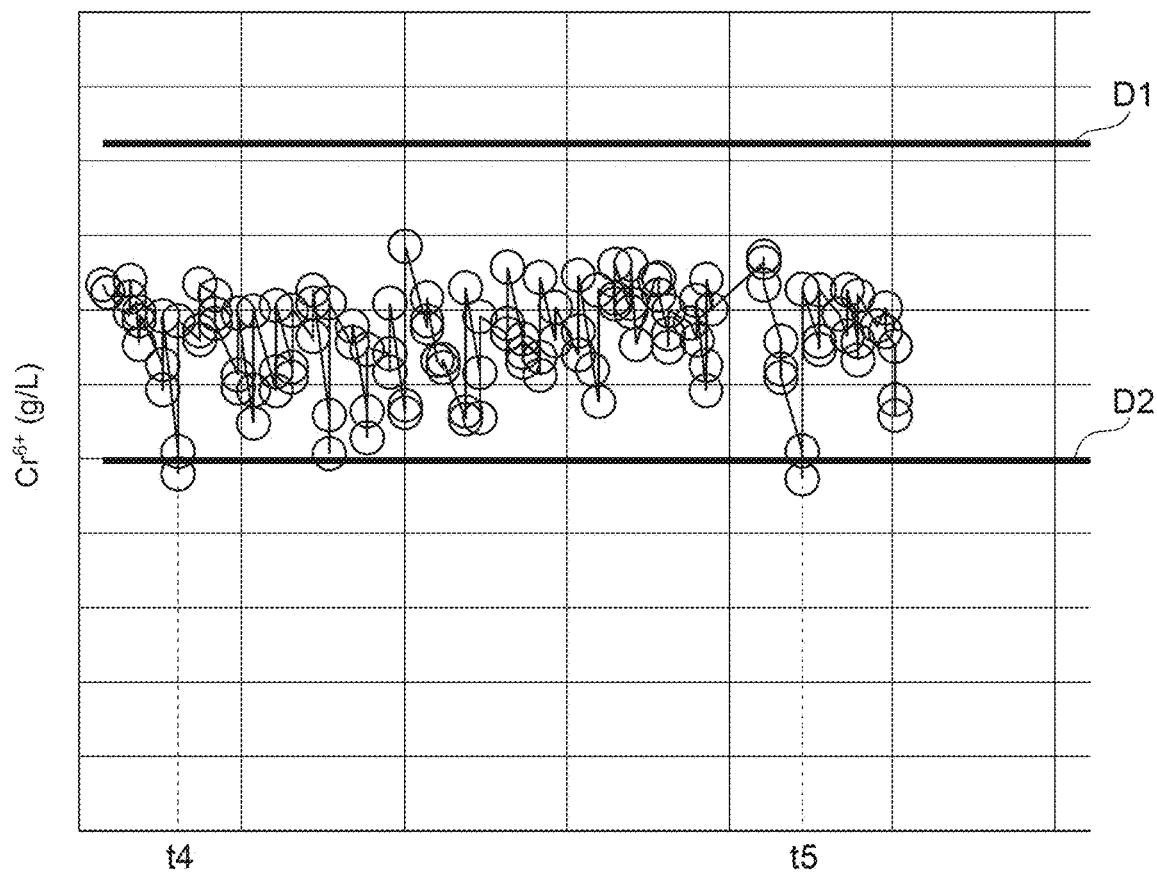
FIG. 16 is a display example of the display device regarding the hexavalent chromium concentration in the acidic treatment liquid detected by the component analysis part according to the tenth embodiment.

Next, monitoring examples of the display device 202 when the acidic treatment liquid is processed using the acidic treatment liquid processing apparatus 200 having the configuration shown in FIG. 11 will be described. FIG. 15 is a display example of the display device 202 regarding the nitric acid concentration in the acidic treatment liquid detected by the component analysis part 201 according to the tenth embodiment. FIG. 16 is a display example of the display device 202 regarding the hexavalent chromium concentration in the acidic treatment liquid detected by the component analysis part 201 according to the tenth embodiment.

As shown in FIG. 15, in the acidic treatment liquid processing apparatus 200, a concentration upper limit value D1 and a concentration lower limit value D2 defining an appropriate range of the nitric acid concentration are previously set and displayed on the monitor of the display device 202. On the display device 202, the temporal change in nitric acid concentration contained in the acidic treatment liquid discharged from the first chamber S1 is displayed in real time. At times t1 and t3 in FIG. 15, the nitric acid concentration exceeds the concentration upper limit value D1, which suggests an abnormality. When the nitric acid concentration exceeds the concentration upper limit value D1, the acidic treatment liquid processing apparatus 200 may be temporarily stopped. Then, the acidic treatment liquid processing apparatus 200 is inspected in the stopped state, and if an abnormality is found, an appropriate countermeasure is taken, and the operation is then restarted. As such a countermeasure, for example, when a defect is found in the acidic treatment liquid processing apparatus 200 itself, repair is performed. When a defect is not found in the acidic treatment liquid processing apparatus 200 itself, but it is due to an abnormality in the component of the acidic treatment liquid, the nitric acid concentration is adjusted to an appropriate range by adding pure water to the acidic treatment liquid. On the other hand, if it is confirmed that there is no abnormality, the operation of the acidic treatment liquid processing apparatus 200 is promptly restarted.

At time t2 in FIG. 15, the nitric acid concentration falls below the concentration lower limit value D2, which suggests an abnormality. When the nitric acid concentration falls below the concentration lower limit value D2, for example, the acidic treatment liquid processing apparatus 200 may be temporarily stopped. Then, the acidic treatment liquid processing apparatus 200 is inspected in the stopped state, and if an abnormality is found, an appropriate countermeasure is taken. As such a countermeasure, for example, when the diaphragm 12 breaks, the acidic treatment liquid processing apparatus 200 is disassembled, and the diaphragm 12 is repaired or replaced. When a defect is not found in the acidic treatment liquid processing apparatus 200 itself, but it is due to an abnormality in the component of the acidic treatment liquid, the nitric acid concentration is adjusted to an appropriate range by adding a deficient component (nitric acid) to the acidic treatment liquid. On the other hand, if it is confirmed that there is no abnormality, the operation of the acidic treatment liquid processing apparatus 200 is promptly restarted.

At times t4 and t5 in FIG. 16, the hexavalent chromium concentration falls below the concentration lower limit value D2, which suggests an abnormality. When the nitric acid concentration falls below the concentration lower limit value D2, for example, the acidic treatment liquid processing apparatus 200 may be temporarily stopped. Then, the acidic treatment liquid processing apparatus 200 is inspected in the stopped state, and if an abnormality is found, an appropriate countermeasure is taken. As such a countermeasure, for example, when the diaphragm 12 breaks, the acidic treatment liquid processing apparatus 200 is disassembled, and the diaphragm 12 is repaired or replaced. When a defect is not found in the acidic treatment liquid processing apparatus 200 itself, but it is due to an abnormality in the component of the acidic treatment liquid, the nitric acid concentration is adjusted to an appropriate range by adding a deficient component (hexavalent chromium) to the acidic treatment liquid. On the other hand, if it is confirmed that there is no abnormality, the operation of the acidic treatment liquid processing apparatus 200 is promptly restarted.

REFERENCE SIGNS LIST 10, 10A, 20, 30 Acidic treatment liquid processing apparatus
11 Tank
12 Diaphragm
12A Cation exchange membrane
12B Bipolar membrane
13 First electrode
14 Second electrode
15 Power supply
16 First liquid passing part
17 Second liquid passing part
S1 First chamber
S2 Second chamber
21 Third electrode
22 Fourth electrode
23 Second power supply
31 Voltmeter
32 Ammeter
33 Sensor
34 Control part
40 Surface treatment system 41 Surface treatment tank
42 Acidic treatment liquid transfer part
51 Acid concentration detection part
52 Circulation passage
53 Discharge part
55 Acid aqueous solution supply part
55 Spare tank
58, 62, 72, 82 Supply control part
59 Intermediate electrode
61 Voltage detection part
71 Energization time counting part
81 Cumulative energization amount detection part
91 Third liquid passing part
201 Component analysis part
202 Display device

The invention claimed is:

1. An acidic treatment liquid processing method, comprising:
   passing an acidic treatment liquid containing a dichromate ion and a metal cation into a first chamber separated from a second chamber by a diaphragm permeable to a metal cation, and passing an acid aqueous solution into the second chamber;
   applying a voltage while using a first electrode disposed in the first chamber as an anode and a second electrode disposed in the second chamber as a cathode to move a metal cation in the acidic treatment liquid to the acid aqueous solution through the diaphragm; and
   measuring, during applying a voltage to the first electrode and the second electrode, a temperature of the acidic solution in the second chamber using a sensor,
   wherein, in response to a determination that the diaphragm breaks based on a measurement result of the sensor, the applying of the voltage and the passing of the acidic treatment liquid are stopped.

2. The acidic treatment liquid processing method according to claim 1, comprising additionally supplying the acid aqueous solution from outside to a circulation passage configured to circulate a predetermined amount of the acid aqueous solution in the second chamber.

3. The acidic treatment liquid processing method according to claim 2,
   wherein the additional supply amount of the acid aqueous solution is controlled such that a voltage between the first electrode and the second electrode is not greater than a predetermined voltage value.

4. The acidic treatment liquid processing method according to claim 2, wherein the additional supply of the acid aqueous solution starts when a cumulative energization time of the power supply exceeds a predetermined time.

5. The acidic treatment liquid processing method according to claim 2, wherein the additional supply of the acid aqueous solution starts when a cumulative energization amount of the power supply exceeds a predetermined energization amount.

6. The acidic treatment liquid processing method according to claim 2, further comprising passing the acidic treatment liquid into the second chamber.

7. The acidic treatment liquid processing method according to claim 6,
   wherein the acidic treatment liquid is passed into the second chamber when a precipitate on the second electrode exceeds a predetermined amount.

8. A surface treatment method, comprising:
   performing surface treatment of a metallic material using an acidic treatment liquid containing a dichromate ion;
   processing the acidic treatment liquid which has been used for the surface treatment and contains a dichromate ion and a metal cation by the acidic treatment liquid processing method according to claim 1; and
   reusing the acidic treatment liquid processed by the acidic treatment liquid processing method for the surface treatment.

* * * * *